US008266220B2

(12) United States Patent
Bodin et al.

(10) Patent No.: US 8,266,220 B2
(45) Date of Patent: Sep. 11, 2012

(54) EMAIL MANAGEMENT AND RENDERING

(75) Inventors: William K. Bodin, Austin, TX (US);
David Jaramillo, Lake Worth, FL (US);
Jerry W. Redman, Cedar Park, TX (US);
Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 11/226,746

(22) Filed: Sep. 14, 2005

(65) Prior Publication Data
US 2007/0061401 A1 Mar. 15, 2007

(51) Int. Cl.
*G06F 15/16* (2006.01)

(52) U.S. Cl. ............... 709/206; 709/207; 348/230.1; 455/344; 398/2

(58) Field of Classification Search ............ 709/206–207
See application file for complete search history.

(56) References Cited

U.S. PATENT DOCUMENTS

| | | | |
|---|---|---|---|
| 4,785,408 A | 11/1988 | Britton et al. | |
| 5,341,469 A | 8/1994 | Rossberg et al. | |
| 5,377,354 A * | 12/1994 | Scannell et al. ............. | 718/103 |
| 5,564,043 A | 10/1996 | Siefert | |
| 5,715,370 A | 2/1998 | Luther et al. | |
| 5,732,216 A | 3/1998 | Logan et al. | |
| 5,774,131 A | 6/1998 | Kim | |
| 5,819,220 A | 10/1998 | Sarukkai et al. | |
| 5,884,266 A | 3/1999 | Dvorak | |
| 5,892,825 A | 4/1999 | Mages et al. | |
| 5,901,287 A | 5/1999 | Bull et al. | |
| 5,903,727 A | 5/1999 | Nielsen | |
| 5,911,776 A | 6/1999 | Guck | |
| 5,978,463 A | 11/1999 | Jurkevics et al. | |
| 6,006,187 A | 12/1999 | Tanenblatt | |
| 6,012,098 A | 1/2000 | Bayeh et al. | |
| 6,029,135 A | 2/2000 | Krasle | |
| 6,032,260 A | 2/2000 | Sasmazel et al. | |
| 6,044,347 A | 3/2000 | Abella et al. | |
| 6,055,525 A | 4/2000 | Nusbickel | |
| 6,088,026 A | 7/2000 | Williams | |

(Continued)

FOREIGN PATENT DOCUMENTS

CN            1123075        5/1996

(Continued)

OTHER PUBLICATIONS

Mohan et al. "Adapting Multimedia Internet Content for Universal Access." IBM T.J Watson Research Center, pp. 1-35.

(Continued)

*Primary Examiner* — Michael Y Won
*Assistant Examiner* — Hua Fan
(74) *Attorney, Agent, or Firm* — Brevetto Law Group

(57) ABSTRACT

Methods, systems, and products are disclosed for email management and rendering, including receiving aggregated email in native form, synthesizing the aggregated native form email into synthesized email, and presenting the synthesized email. Synthesizing the aggregated native form email into a synthesized email may also include translating aspects of the native form email into text and markup. Synthesizing the aggregated native form email into a synthesized email may also include identifying attachments to the aggregated native form email and translating aspects of the attachments into text and markup. Presenting the synthesized email also includes identifying a presentation action in dependence upon presentation rules and executing the presentation action.

24 Claims, 20 Drawing Sheets

U.S. PATENT DOCUMENTS

| | | | |
|---|---|---|---|
| 6,092,121 | A | 7/2000 | Bennett et al. |
| 6,115,686 | A | 9/2000 | Chung et al. |
| 6,141,693 | A | 10/2000 | Perlman et al. |
| 6,178,511 | B1 | 1/2001 | Cohen et al. |
| 6,199,076 | B1 | 3/2001 | Logan et al. |
| 6,233,318 | B1 | 5/2001 | Picard et al. |
| 6,240,391 | B1 | 5/2001 | Ball |
| 6,266,649 | B1 | 7/2001 | Linden |
| 6,282,511 | B1 | 8/2001 | Mayer |
| 6,282,512 | B1 | 8/2001 | Hemphill |
| 6,311,194 | B1 | 10/2001 | Sheth |
| 6,317,714 | B1 | 11/2001 | Del Castillo et al. |
| 6,463,440 | B1 | 10/2002 | Hind |
| 6,480,860 | B1 | 11/2002 | Monday |
| 6,510,413 | B1 | 1/2003 | Walker |
| 6,519,617 | B1 | 2/2003 | Wanderski |
| 6,532,477 | B1 | 3/2003 | Tang et al. |
| 6,563,770 | B1 | 5/2003 | Kokhab |
| 6,574,599 | B1 | 6/2003 | Lim et al. |
| 6,593,943 | B1 * | 7/2003 | MacPhail ..................... 715/734 |
| 6,594,637 | B1 | 7/2003 | Furukawa et al. |
| 6,604,076 | B1 | 8/2003 | Holley et al. |
| 6,611,876 | B1 | 8/2003 | Barrett et al. |
| 6,684,370 | B1 | 1/2004 | Sikorsky |
| 6,687,678 | B1 | 2/2004 | Yorimatsu et al. |
| 6,731,993 | B1 | 5/2004 | Carter et al. |
| 6,771,743 | B1 | 8/2004 | Butler |
| 6,792,407 | B2 | 9/2004 | Kibre et al. |
| 6,802,041 | B1 | 10/2004 | Rehm |
| 6,832,196 | B2 | 12/2004 | Reich |
| 6,839,669 | B1 | 1/2005 | Gould |
| 6,859,527 | B1 | 2/2005 | Banks et al. |
| 6,901,403 | B1 | 5/2005 | Bata et al. |
| 6,912,691 | B1 | 6/2005 | Dodrill |
| 6,944,214 | B1 | 9/2005 | Gilbert |
| 6,944,591 | B1 | 9/2005 | Raghunandan |
| 6,965,569 | B1 | 11/2005 | Carolan |
| 6,976,082 | B1 | 12/2005 | Ostermann |
| 6,990,451 | B2 | 1/2006 | Case et al. |
| 6,993,476 | B1 | 1/2006 | Dutta |
| 7,017,120 | B2 | 3/2006 | Shnier |
| 7,031,477 | B1 | 4/2006 | Mella et al. |
| 7,039,643 | B2 | 5/2006 | Sena |
| 7,046,772 | B1 | 5/2006 | Moore |
| 7,054,818 | B2 | 5/2006 | Sharma et al. |
| 7,062,437 | B2 | 6/2006 | Kovales et al. |
| 7,065,222 | B2 | 6/2006 | Wilcock |
| 7,069,092 | B2 | 6/2006 | Wiser et al. |
| 7,107,281 | B2 | 9/2006 | De La Huerga |
| 7,113,909 | B2 | 9/2006 | Nukaga et al. |
| 7,120,702 | B2 | 10/2006 | Huang |
| 7,130,850 | B2 | 10/2006 | Russell-Falla |
| 7,139,713 | B2 | 11/2006 | Falcon |
| 7,149,694 | B1 | 12/2006 | Harb et al. |
| 7,149,810 | B1 | 12/2006 | Miller et al. |
| 7,162,502 | B2 | 1/2007 | Suarez et al. |
| 7,171,411 | B1 | 1/2007 | Lewis |
| 7,178,100 | B2 | 2/2007 | Call |
| 7,313,528 | B1 | 12/2007 | Miller |
| 7,346,649 | B1 | 3/2008 | Wong |
| 7,349,949 | B1 | 3/2008 | Connor et al. |
| 7,356,470 | B2 | 4/2008 | Roth |
| 7,366,712 | B2 | 4/2008 | He |
| 7,369,988 | B1 | 5/2008 | Thenthiruperal et al. |
| 7,386,575 | B2 | 6/2008 | Bashant et al. |
| 7,392,102 | B2 | 6/2008 | Sullivan et al. |
| 7,430,510 | B1 | 9/2008 | De Fabbrizio et al. |
| 7,437,408 | B2 | 10/2008 | Schwartz |
| 7,454,346 | B1 | 11/2008 | Dodrill |
| 7,505,978 | B2 | 3/2009 | Bodin |
| 7,561,932 | B1 | 7/2009 | Holmes et al. |
| 7,568,213 | B2 | 7/2009 | Carhart et al. |
| 7,657,006 | B2 | 2/2010 | Woodring |
| 7,685,525 | B2 | 3/2010 | Kumar |
| 7,890,517 | B2 | 2/2011 | Angelo |
| 7,949,681 | B2 | 5/2011 | Bodin |
| 7,996,754 | B2 | 8/2011 | Bodin |
| 2001/0014146 | A1 | 8/2001 | Beyda et al. |
| 2001/0027396 | A1 | 10/2001 | Sato |
| 2001/0040900 | A1 | 11/2001 | Salmi |
| 2001/0049725 | A1 | 12/2001 | Kosuge |
| 2001/0054074 | A1 | 12/2001 | Hayashi |
| 2002/0013708 | A1 | 1/2002 | Walker |
| 2002/0015480 | A1 | 2/2002 | Daswani |
| 2002/0032564 | A1 | 3/2002 | Ehsani |
| 2002/0032776 | A1 | 3/2002 | Hasegawa |
| 2002/0039426 | A1 | 4/2002 | Takemoto |
| 2002/0054090 | A1 | 5/2002 | Silva |
| 2002/0057678 | A1 | 5/2002 | Jiang et al. |
| 2002/0062216 | A1 | 5/2002 | Guenther |
| 2002/0062393 | A1 | 5/2002 | Borger |
| 2002/0083013 | A1 | 6/2002 | Rollins |
| 2002/0120693 | A1 * | 8/2002 | Rudd et al. ..................... 709/206 |
| 2002/0128837 | A1 | 9/2002 | Morin |
| 2002/0143414 | A1 | 10/2002 | Wilcock |
| 2002/0151998 | A1 | 10/2002 | Kemppi et al. |
| 2002/0152210 | A1 | 10/2002 | Johnson |
| 2002/0095292 | A1 | 11/2002 | Mittal |
| 2002/0169770 | A1 | 11/2002 | Kim et al. |
| 2002/0173964 | A1 | 11/2002 | Reich |
| 2002/0178007 | A1 | 11/2002 | Slotznick |
| 2002/0193894 | A1 | 12/2002 | Terada et al. |
| 2002/0194286 | A1 | 12/2002 | Matsuura |
| 2002/0194480 | A1 | 12/2002 | Nagao |
| 2002/0198714 | A1 | 12/2002 | Zhou |
| 2002/0198720 | A1 | 12/2002 | Takagi |
| 2003/0018727 | A1 * | 1/2003 | Yamamoto ..................... 709/206 |
| 2003/0028380 | A1 | 2/2003 | Freeland et al. |
| 2003/0033331 | A1 | 2/2003 | Sena |
| 2003/0055835 | A1 | 3/2003 | Roth |
| 2003/0055868 | A1 | 3/2003 | Fletcher |
| 2003/0103606 | A1 | 6/2003 | Rhie |
| 2003/0108184 | A1 | 6/2003 | Brown et al. |
| 2003/0110185 | A1 | 6/2003 | Rhoads |
| 2003/0110272 | A1 | 6/2003 | du Castel |
| 2003/0110297 | A1 | 6/2003 | Tabatabai |
| 2003/0115056 | A1 | 6/2003 | Gusler |
| 2003/0115064 | A1 | 6/2003 | Gusler |
| 2003/0115289 | A1 | 6/2003 | Chinn et al. |
| 2003/0126293 | A1 | 7/2003 | Bushey |
| 2003/0132953 | A1 | 7/2003 | Johnson |
| 2003/0145062 | A1 | 7/2003 | Sharma et al. |
| 2003/0151618 | A1 | 8/2003 | Johnson et al. |
| 2003/0156130 | A1 | 8/2003 | James et al. |
| 2003/0158737 | A1 | 8/2003 | Csicsatka |
| 2003/0160770 | A1 | 8/2003 | Zimmerman |
| 2003/0163211 | A1 | 8/2003 | Van Der Meulen |
| 2003/0167234 | A1 | 9/2003 | Bodmer |
| 2003/0172066 | A1 | 9/2003 | Cooper |
| 2003/0182000 | A1 | 9/2003 | Muesch et al. |
| 2003/0182124 | A1 | 9/2003 | Khan |
| 2003/0187668 | A1 | 10/2003 | Ullmann |
| 2003/0187726 | A1 | 10/2003 | Bull et al. |
| 2003/0188255 | A1 | 10/2003 | Shimizu |
| 2003/0212654 | A1 | 11/2003 | Harper |
| 2003/0225599 | A1 | 12/2003 | Mueller |
| 2003/0229847 | A1 | 12/2003 | Kim |
| 2004/0003394 | A1 | 1/2004 | Ramaswamy |
| 2004/0034653 | A1 | 2/2004 | Maynor |
| 2004/0041835 | A1 | 3/2004 | Lu |
| 2004/0044665 | A1 | 3/2004 | Nwabueze |
| 2004/0049477 | A1 | 3/2004 | Powers et al. |
| 2004/0068552 | A1 | 4/2004 | Kotz |
| 2004/0088063 | A1 | 5/2004 | Hoshi et al. |
| 2004/0088349 | A1 | 5/2004 | Beck |
| 2004/0093350 | A1 | 5/2004 | Alexander et al. |
| 2004/0107125 | A1 | 6/2004 | Guheen |
| 2004/0120479 | A1 | 6/2004 | Creamer et al. |
| 2004/0128276 | A1 | 7/2004 | Scanlon |
| 2004/0143430 | A1 | 7/2004 | Said et al. |
| 2004/0153178 | A1 | 8/2004 | Koch et al. |
| 2004/0172254 | A1 | 9/2004 | Sharma et al. |
| 2004/0199375 | A1 | 10/2004 | Ehsani |
| 2004/0201609 | A1 | 10/2004 | Obrador |
| 2004/0210626 | A1 | 10/2004 | Bodin |
| 2004/0225499 | A1 | 11/2004 | Wang et al. |
| 2004/0254851 | A1 | 12/2004 | Himeno |

| | | |
|---|---|---|
| 2004/0267387 A1 | 12/2004 | Samadani |
| 2004/0267774 A1 | 12/2004 | Lin |
| 2005/0004992 A1* | 1/2005 | Horstmann et al. ......... 709/206 |
| 2005/0015254 A1 | 1/2005 | Beaman |
| 2005/0015718 A1* | 1/2005 | Sambhus et al. ............. 715/513 |
| 2005/0021826 A1 | 1/2005 | Kumar |
| 2005/0043940 A1 | 2/2005 | Elder |
| 2005/0045373 A1 | 3/2005 | Born |
| 2005/0065625 A1 | 3/2005 | Sass |
| 2005/0071780 A1 | 3/2005 | Muller |
| 2005/0076365 A1 | 4/2005 | Popov |
| 2005/0108521 A1 | 5/2005 | Silhavy |
| 2005/0114139 A1 | 5/2005 | Dincer |
| 2005/0120083 A1* | 6/2005 | Aizawa et al. ................ 709/206 |
| 2005/0137875 A1 | 6/2005 | Kim et al. |
| 2005/0138063 A1 | 6/2005 | Bazot |
| 2005/0144002 A1 | 6/2005 | Ps |
| 2005/0144022 A1 | 6/2005 | Evans |
| 2005/0152344 A1 | 7/2005 | Chiu et al. |
| 2005/0154580 A1 | 7/2005 | Horowitz et al. |
| 2005/0154969 A1 | 7/2005 | Bodin |
| 2005/0190897 A1 | 9/2005 | Eberle et al. |
| 2005/0195999 A1 | 9/2005 | Takemura et al. |
| 2005/0203887 A1 | 9/2005 | Joshi |
| 2005/0203959 A1 | 9/2005 | Muller |
| 2005/0203960 A1 | 9/2005 | Suarez et al. |
| 2005/0232242 A1 | 10/2005 | Karaoguz |
| 2005/0234727 A1 | 10/2005 | Chiu |
| 2005/0251513 A1 | 11/2005 | Tenazas |
| 2005/0262119 A1 | 11/2005 | Mawdsley |
| 2005/0288926 A1 | 12/2005 | Benco |
| 2006/0008252 A1 | 1/2006 | Kim |
| 2006/0008258 A1 | 1/2006 | Kawana |
| 2006/0020662 A1 | 1/2006 | Robinson |
| 2006/0031447 A1 | 2/2006 | Holt |
| 2006/0041549 A1 | 2/2006 | Gundersen et al. |
| 2006/0048212 A1 | 3/2006 | Tsuruoka |
| 2006/0050794 A1 | 3/2006 | Tan |
| 2006/0050996 A1 | 3/2006 | King et al. |
| 2006/0052089 A1 | 3/2006 | Khurana |
| 2006/0075224 A1 | 4/2006 | Tao |
| 2006/0085199 A1 | 4/2006 | Jain |
| 2006/0095848 A1 | 5/2006 | Naik |
| 2006/0112844 A1 | 6/2006 | Hiller |
| 2006/0114987 A1 | 6/2006 | Roman |
| 2006/0123082 A1 | 6/2006 | Tonytip et al. |
| 2006/0136449 A1 | 6/2006 | Parker |
| 2006/0140360 A1 | 6/2006 | Crago |
| 2006/0149781 A1 | 7/2006 | Blankinship |
| 2006/0155698 A1 | 7/2006 | Vayssiere |
| 2006/0159109 A1 | 7/2006 | Lamkin |
| 2006/0165104 A1 | 7/2006 | Kaye |
| 2006/0168507 A1 | 7/2006 | Hansen |
| 2006/0173985 A1 | 8/2006 | Moore |
| 2006/0184679 A1 | 8/2006 | Izdepski |
| 2006/0190616 A1 | 8/2006 | Mayerhofer |
| 2006/0193450 A1 | 8/2006 | Flynt |
| 2006/0200743 A1 | 9/2006 | Thong et al. |
| 2006/0206533 A1 | 9/2006 | MacLaurin |
| 2006/0224739 A1 | 10/2006 | Anantha |
| 2006/0233327 A1 | 10/2006 | Roberts |
| 2006/0242663 A1 | 10/2006 | Gogerty |
| 2006/0253699 A1 | 11/2006 | Della-Libera |
| 2006/0265503 A1 | 11/2006 | Jones et al. |
| 2006/0282317 A1 | 12/2006 | Rosenberg |
| 2006/0282822 A1 | 12/2006 | Weng |
| 2006/0287745 A1 | 12/2006 | Richenstein et al. |
| 2006/0288011 A1 | 12/2006 | Gandhi |
| 2007/0005339 A1 | 1/2007 | Jaquinta |
| 2007/0027692 A1 | 2/2007 | Sharma et al. |
| 2007/0027859 A1 | 2/2007 | Harney et al. |
| 2007/0027958 A1 | 2/2007 | Haslam |
| 2007/0043735 A1 | 2/2007 | Bodin et al. |
| 2007/0043758 A1 | 2/2007 | Bodin et al. |
| 2007/0043759 A1 | 2/2007 | Bodin et al. |
| 2077/0043462 | 2/2007 | Terada et al. |
| 2007/0061132 A1 | 3/2007 | Bodin |
| 2007/0061229 A1 | 3/2007 | Ramer |
| 2007/0061266 A1 | 3/2007 | Moore |
| 2007/0061371 A1 | 3/2007 | Bodin et al. |
| 2007/0061401 A1 | 3/2007 | Bodin et al. |
| 2007/0061711 A1 | 3/2007 | Bodin |
| 2007/0061712 A1 | 3/2007 | Bodin |
| 2007/0073728 A1 | 3/2007 | Klein, Jr. |
| 2007/0077921 A1 | 4/2007 | Hayashi |
| 2007/0078655 A1 | 4/2007 | Semkow |
| 2007/0083540 A1 | 4/2007 | Gundla |
| 2007/0091206 A1 | 4/2007 | Bloebaum |
| 2007/0100628 A1 | 5/2007 | Bodin et al. |
| 2007/0100629 A1 | 5/2007 | Bodin et al. |
| 2007/0100787 A1 | 5/2007 | Lim et al. |
| 2007/0100836 A1 | 5/2007 | Eichstaedt et al. |
| 2007/0101274 A1 | 5/2007 | Kurlander |
| 2007/0101313 A1 | 5/2007 | Bodin et al. |
| 2007/0112844 A1 | 5/2007 | Tribble |
| 2007/0118426 A1 | 5/2007 | Barnes, Jr. |
| 2007/0124458 A1 | 5/2007 | Kumar |
| 2007/0124802 A1 | 5/2007 | Anton, Jr. |
| 2007/0130589 A1 | 6/2007 | Davis |
| 2007/0138999 A1 | 6/2007 | Lee et al. |
| 2007/0147274 A1 | 6/2007 | Vasa |
| 2007/0165538 A1 | 7/2007 | Bodin |
| 2007/0168191 A1 | 7/2007 | Bodin et al. |
| 2007/0168194 A1 | 7/2007 | Bodin et al. |
| 2007/0174326 A1 | 7/2007 | Schwartz |
| 2007/0191008 A1 | 8/2007 | Bucher |
| 2007/0192327 A1 | 8/2007 | Bodin |
| 2007/0192672 A1 | 8/2007 | Bodin |
| 2007/0192673 A1 | 8/2007 | Bodin |
| 2007/0192674 A1 | 8/2007 | Bodin |
| 2007/0192675 A1 | 8/2007 | Bodin et al. |
| 2007/0192676 A1 | 8/2007 | Bodin |
| 2007/0192683 A1 | 8/2007 | Bodin |
| 2007/0192684 A1 | 8/2007 | Bodin |
| 2007/0198267 A1 | 8/2007 | Jones et al. |
| 2007/0208687 A1 | 9/2007 | O'Conor |
| 2007/0213857 A1 | 9/2007 | Bodin |
| 2007/0213986 A1 | 9/2007 | Bodin |
| 2007/0214147 A1 | 9/2007 | Bodin |
| 2007/0214148 A1 | 9/2007 | Bodin |
| 2007/0214149 A1 | 9/2007 | Bodin |
| 2007/0214485 A1 | 9/2007 | Bodin |
| 2007/0220024 A1 | 9/2007 | Putterman |
| 2007/0239837 A1 | 10/2007 | Jablokov |
| 2007/0253699 A1 | 11/2007 | Yen |
| 2007/0276837 A1 | 11/2007 | Bodin |
| 2007/0276865 A1 | 11/2007 | Bodin |
| 2007/0276866 A1 | 11/2007 | Bodin |
| 2007/0277088 A1 | 11/2007 | Bodin |
| 2007/0277233 A1 | 11/2007 | Bodin |
| 2008/0034278 A1 | 2/2008 | Tsou |
| 2008/0052415 A1 | 2/2008 | Kellerman |
| 2008/0082576 A1 | 4/2008 | Bodin |
| 2008/0082635 A1 | 4/2008 | Bodin |
| 2008/0155616 A1 | 6/2008 | Logan et al. |
| 2008/0161948 A1 | 7/2008 | Bodin |
| 2008/0162131 A1 | 7/2008 | Bodin |
| 2008/0162559 A1 | 7/2008 | Bodin |
| 2008/0275893 A1 | 11/2008 | Bodin |
| 2009/0271178 A1 | 10/2009 | Bodin |

FOREIGN PATENT DOCUMENTS

| | | |
|---|---|---|
| CN | 1123075 A | 5/1996 |
| CN | 1298173 | 6/2001 |
| CN | 1298173 A | 6/2001 |
| CN | 1368719 A | 4/2008 |
| CN | 1368719 C | 4/2008 |
| EP | 1197884 A2 | 4/2002 |
| GB | 2369955 | 6/2002 |
| KR | 2001-0071517 | 7/2001 |
| KR | 102001007151 A | 7/2001 |
| KR | 2004-0078888 | 9/2004 |
| KR | 102004007888 A | 9/2004 |
| WO | WO 0182139 | 11/2001 |
| WO | WO2005106846 | 11/2005 |

OTHER PUBLICATIONS

Lu et al., "Audio Ticker". WWW7 / Computer Networks 30(1-7): 721-722 (1998).
http://webarchive.org/web/20031203063919/http://eastbaytech.com/im.htm.
http://www.odiogo.com.
FeedForAll at http://web.archive.org/web/20050813012521/http://www.feedforall.com/itune-tutorial-tags.htm.
Internet Archive for FeedForAll at http://web.archive.org/web/*/http://www.feedforall.com/itune-tuntorial-tags.htm.
Audioblog at http://web.archive.org/web/20040923235033.
Zhang, Liang-Jie, et al., "XML-Based Advanced UDDI Search Mechanism for B2B Integration", Electronic Commerce Research, vol. 3, Nos. 1-2, Jan. 2003, pp. 24-42.
He Tian, et al., "AIDA: Adaptive Application-Independent Data Aggregation in Wireless Sensor Networks", TECS, vol. 3, Issue 2, May 2004, pp. 426-457.
Braun N. Doner R: "Using Sonic Hyperlinks in Web-TV," International Conf on Auditory Displays (ICAD '98), Nov. 1, 1998, XPOO2428659, Glasgow, UK.
Braun N. et al: "Temporal hypermedia for multimedia applications in the World Wide Web," Computational Intelligence and Multimedia Applications, 1999. ICCIMA '99. Third International Conference on New Delhi, India, Sep. 23-23, 1999. Los Alamitos, CA USE, IEEE Comput. SAC, US, Sep. 23, 1999, XP010355646 ISBN: 0-7695-0300-4.
Frankie James: "AHA: audio HTML access" Computer Networks and ISDN Systems, vol. 209, No. 8-13, Sep. 1997, pp. 1395-1404, XP002430654.
PCT Search Report, Sep. 2, 2007; PCT Application No. PCT/EP2007/051260.
Barbara, et al.; "The Audio Web"; Proc. $6^{th}$ Int. Conf. on Information and Knowledge Management; Jan. 1997; XP002352519; Las Vegas; USA; pp. 97-104.
Office Action Dated Jun. 11, 2009 in U.S. Appl. No. 11/352,710.
Office Action Dated May 19, 2009 in U.S. Appl. No. 11/352,727.
Final Office Action Dated Apr. 20, 2009 in U.S. Appl. No. 11/266,559.
Final Office Action Dated Oct. 30, 2008 in U.S. Appl. No. 11/266,662.
Final Office Action Dated Apr. 6, 2009 in U.S. Appl. No. 11/266,675.
Final Office Action Dated Dec. 19, 2008 in U.S. Appl. No. 11/266,698.
Office Action Dated May 14, 2009 in U.S. Appl. No. 11/352,709.
Final Office Action Dated Apr. 29, 2008 in U.S. Appl. No. 11/207,911.
Final Office Action Dated Apr. 15, 2009 in U.S. Appl. No. 11/207,911.
Final Office Action Dated Sep. 25, 2008 in U.S. Appl. No. 11/226,747.
Final Office Action Dated May 7, 2008 in U.S. Appl. No. 11/226,744.
Final Office Action Dated May 7, 2008 in U.S. Appl. No. 11/207,912.
Final Office Action Dated Apr. 28, 2009 in U.S. Appl. No. 11/207,912.
Final Office Action Dated Sep. 16, 2008 in U.S. Appl. No. 11/266,663.
Final Office Action Dated Mar. 30, 2009 in U.S. Appl. No. 11/331,694.
Final Office Action Dated Feb. 9, 2009 in U.S. Appl. No. 11/331,692.
Final Office Action Dated May 7, 2008 in U.S. Appl. No. 11/207,914.
Final Office Action Dated Apr. 14, 2009 in U.S. Appl. No. 11/207,914.
Final Office Action Dated Dec. 23, 2008 in U.S. Appl. No. 11/207,913.
Final Office Action Dated Sep. 15, 2008 in U.S. Appl. No. 11/226,746.
Monahan et al.; "Adapting Multimedia Internet Content for Universal Access"; IEEE Transactions on Multimedia, vol. 1, No. 1; pp. 104-114; 1999.
Babara et al.; Bell Communications Research, Morristown, NJ; "The Audio Web"; pp. 97-104; 1997.

Hoschka, et al; "Synchronized Multimedia Integration Language (SMIL) 1.0 Specification"; pp. 1-43; found at website http://www.w3.org/TR/1998IPR-smil-19980409; Apr. 9, 1998.
Casalaina et al., "BMRC Procedures: RealMedia Guide"; pp. 1-7; Berkeley Multimedia Research Center, Berkeley, CA; found at http://web.archive.org/web/20030218131051/http://bmrc.berkeley.edu/info/procedures/rm.html; Feb. 13, 1998.
Buchanan et al.; "Representing Aggregated Works in the Digital Library", pp. 247-256; 2007; University College London; London.
Advertisement of TextToSpeechMP3.com; "Text to Speech MP3 with Natural Voices 1.71"; (author unknown); website; pp. 1-5; 1995.
Andrade et al.; "Managing Multimedia Content and Delivering Services Across Multiple client Platforms using XML"; Symposium; pp. 1-8; 2002; London Communications; London.
International Business Machines Corporation; PCT Search Report; Mar. 27, 2007; Application No. PCT/ EP2007/050594;.
U.S. Appl. No. 11/352,680 Final Office Action mailed Sep. 7, 2010.
U.S. Appl. No. 11/352,679 Office Action mailed May 28, 2010.
U.S. Appl. No. 11/352,679 Final Office Action mailed Nov. 15, 2010.
U.S. Appl. No. 11/372,317 Office Action mailed Sep. 23, 2010.
U.S. Appl. No. 11/372,329 Final Office Action mailed Nov. 6, 2009.
U.S. Appl. No. 11/372,319 Office Action mailed Apr. 21, 2010.
U.S. Appl. No. 11/372,319 Final Office Action mailed Jul. 2, 2010.
U.S. Appl. No. 11/420,017 Final Office Action mailed Apr. 3, 2010.
U.S. Appl. No. 11/420,017 Final Office Action mailed Sep. 23, 2010.
U.S. Appl. No. 11/619,216 Final Office Action mailed Jun. 25, 2010.
U.S. Appl. No. 11/619,236 Final Office Action mailed Oct. 22, 2010.
U.S. Appl. No. 12/178,448 Office Action mailed Apr. 2, 2010.
U.S. Appl. No. 12/178,448 Final Office Action mailed Sep. 14, 2010.
"Adapting Multimedia Internet Content for Universal Access" Rakesh Mohan, John R. Smith, Chung-Sheng Li, IEEE Transactions on Multimedia vol. 1, p. 104-114.
Babara et al.; "The Audio Web"; Proc. 6th Int. conf. on Information and Knowledge Management; Januaty 1997; XP002352519; Las Vegas; USA; pp. 97-104.
Hoschka, et al; "Synchronized Multimedia Intergration Langquage (SMIL) 1.0 Specification"; 89 Apr. 1998; doi: http://www.w3.org/TR11998/PR-smil-199804091#anchor.
Casalaina, et al.; "BMRC Procedures: RealMedia Guide"; doi: http://web.archive.org/web/20030218131051/http://bmrc.berkeley.edu/info/procedures/rm.html.
Buchanan et al.;"Representing Aggregated Works in the Digital Library", ACM, 2007, pp. 247-256.
Text to Speech MP3 with Natural Voices 1.71, Published Oct. 5, 2004.
Managing Multimedia Content and Delivering Services Across Multiple client Platforms using XML, London Communications Symposium, xx, xx, Sep. 10, 2002, pp. 1-7.
PCT Search Report and Written Opinion International Application PCT/EP2007/050594.
U.S. Appl. No. 11/207,912 Office Action mailed Jan. 25, 2010.
U.S. Appl. No. 11/207,911 Notice of Allowance mailed Feb. 3, 2010.
U.S. Appl. No. 11/226,746 Final Office Action mailed Jul. 31, 2009.
U.S. Appl. No. 11/226,746 Office Action mailed Jan. 25, 2010.
U.S. Appl. No. 11/352,709 Final Office Action mailed Nov. 5, 2009.
U.S. Appl. No. 11/352,698 Office Action mailed Apr. 29, 2009.
U.S. Appl. No. 11/331,692 Office Action mailed Aug. 17, 2009.
U.S. Appl. No. 11/352,680 Office Action mailed Jun. 23, 2006.
U.S. Appl. No. 11/372,317 Office Action mailed Jul. 8, 2009.
U.S. Appl. No. 11/536,733 Final Office Action mailed Jul. 22, 2009.
U.S. Appl. No. 11/420,017 Office Action mailed Jul. 9, 2009.
U.S. Appl. No. 11/536,781 Office Action mailed Jul. 17, 2009.
U.S. Appl. No. 11/420,014 Office Action mailed Jul. 23, 2009.
U.S. Appl. No. 11/420,018 Final Office Action mailed Jul. 21, 2009.
U.S. Appl. No. 11/352,760 Office Action mailed Apr. 15, 2009.
U.S. Appl. No. 11/352,760 Final Office Action mailed Nov. 16, 2009.
U.S. Appl. No. 11/352,824 Notice of Allowance mailed Jun. 5, 2008.
U.S. Appl. No. 11/352,824 Office Action mailed Jan. 22, 2008.
U.S. Appl. No. 11/352,680 Final Office Action mailed Dec. 21, 2009.
U.S. Appl. No. 11/352,679 Office Action mailed Apr. 30, 2009.
U.S. Appl. No. 11/352,679 Final Office Action mailed Oct. 29, 2009.
U.S. Appl. No. 11/372,323 Office Action mailed Oct. 28, 2008.
U.S. Appl. No. 11/372,318 Office Action mailed Mar. 18, 2008.

U.S. Appl. No. 11/372,318 Final Office Action mailed Jul. 9, 2008.
U.S. Appl. No. 11/372,325 Office Action mailed Feb. 25, 2009.
U.S. Appl. No. 11/372,329 Office Action mailed Feb. 27, 2009.
U.S. Appl. No. 11/536,781 Final Office Action mailed Jan. 15, 2010.
U.S. Appl. No. 11/420,015 Office Action mailed Mar. 20, 2008.
U.S. Appl. No. 11/420,015 Final Office Action mailed Sep. 3, 2008.
U.S. Appl. No. 11/420,015 Office Action mailed Dec. 2, 2008.
U.S. Appl. No. 11/420,016 Office Action mailed Mar. 3, 2008.
U.S. Appl. No. 11/420,016 Final Office Action mailed Aug. 29, 2008.
U.S. Appl. No. 11/420,017 Final Office Action mailed Dec. 31, 2009.
U.S. Appl. No. 11/420,018 Office Action mailed Mar. 21, 2008.
U.S. Appl. No. 11/420,018 Final Office Action mailed Aug. 29, 2008.
U.S. Appl. No. 11/420,018 Office Action mailed Dec. 3, 2008.
U.S. Appl. No. 11/536,733 Office Action mailed Dec. 30, 2008.
U.S. Appl. No. 11/619,216 Office Action mailed Jan. 26, 2010.
U.S. Appl. No. 11/619,253 Office Action mailed Apr. 2, 2009.
U.S. Appl. No. 11/352,760 Office Action mailed Sep. 16, 2010.
U.S. Appl. No. 11/352,680 Office Action mailed Jun. 10, 2010.
Office Action Dated Jan. 25, 2010 in U.S. Appl. No. 11/207,912.
Notice of Allowance Dated Feb. 3, 2010 in U.S. Appl. No. 11/207,911.
Final Office Action Dated Jul. 31, 2009 in U.S. Appl. No. 11/226,746.
Office Action Dated Jan. 25, 2010 in U.S. Appl. No. 11/226,746.
Final Office Action Dated Nov. 5, 2009 in U.S. Appl. No. 11/352,709.
Braun N. & Doner R.; "Using Sonic Hyperlinks in Web-TV"; International Conf. on Auditory Displays (ICAD '98), Nov. 1, 1998; XP 002428659; Glasgow, UK.
Hoschka, et al.; "Synchronized Multimedia Integration Language (SMIL) 1.0 Specification"; Apr. 9, 1998; doi: http://www.w3.org/TR/1998/PR-smil-19980409/#anchor.
Office Action Dated Apr. 29, 2009 in U.S. Appl. No. 11/352,698.
Office Action Dated Aug. 17, 2009 in U.S. Appl. No. 11/331,692.

* cited by examiner

EMAIL MANAGEMENT AND RENDERING

BACKGROUND OF THE INVENTION

1. Field of the Invention

The field of the invention is data processing, or, more specifically, methods, systems, and products for email management and rendering.

2. Description of Related Art

Despite having more access to data and having more devices to access that data, users are often time constrained. One reason for this time constraint is that users typically must access data of disparate data types from disparate data sources on data type-specific devices using data type-specific applications. One or more such data type-specific devices may be cumbersome for use at a particular time due to any number of external circumstances. Examples of external circumstances that may make data type-specific devices cumbersome to use include crowded locations, uncomfortable locations such as a train or car, user activity such as walking, visually intensive activities such as driving, and others as will occur to those of skill in the art. There is therefore an ongoing need for data management and data rendering for disparate data types that provides access to uniform data type access to content from disparate data sources.

SUMMARY OF THE INVENTION

Methods, systems, and products are disclosed for email management and rendering, including receiving aggregated email in native form, synthesizing the aggregated native form email into synthesized email, and presenting the synthesized email. Synthesizing the aggregated native form email into a synthesized email may also include translating aspects of the native form email into text and markup. Synthesizing the aggregated native form email into a synthesized email may also include identifying attachments to the aggregated native form email and translating aspects of the attachments into text and markup. Presenting the synthesized email also includes identifying a presentation action in dependence upon presentation rules and executing the presentation action.

Email management and rendering may also include identifying, according to prioritization rules, priority characteristics in the aggregated native form email. Synthesizing the aggregated native form email into a synthesized email may also include prioritizing the synthesized email according to these priority characteristics. Presenting the synthesized email may also include presenting the prioritized synthesized email. Email management and rendering may also include receiving email preferences from a user and creating prioritization rules in dependence upon the email preferences.

Prioritizing the synthesized email according to the priority characteristics may also include creating priority markup representing the priority characteristics and associating the priority markup with the synthesized email. Associating the priority markup with the synthesized email also includes creating an email priority markup document and inserting the priority markup into the email priority markup document. Presenting the prioritized synthesized email further comprises presenting the prioritized synthesized email in accordance with the priority markup.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
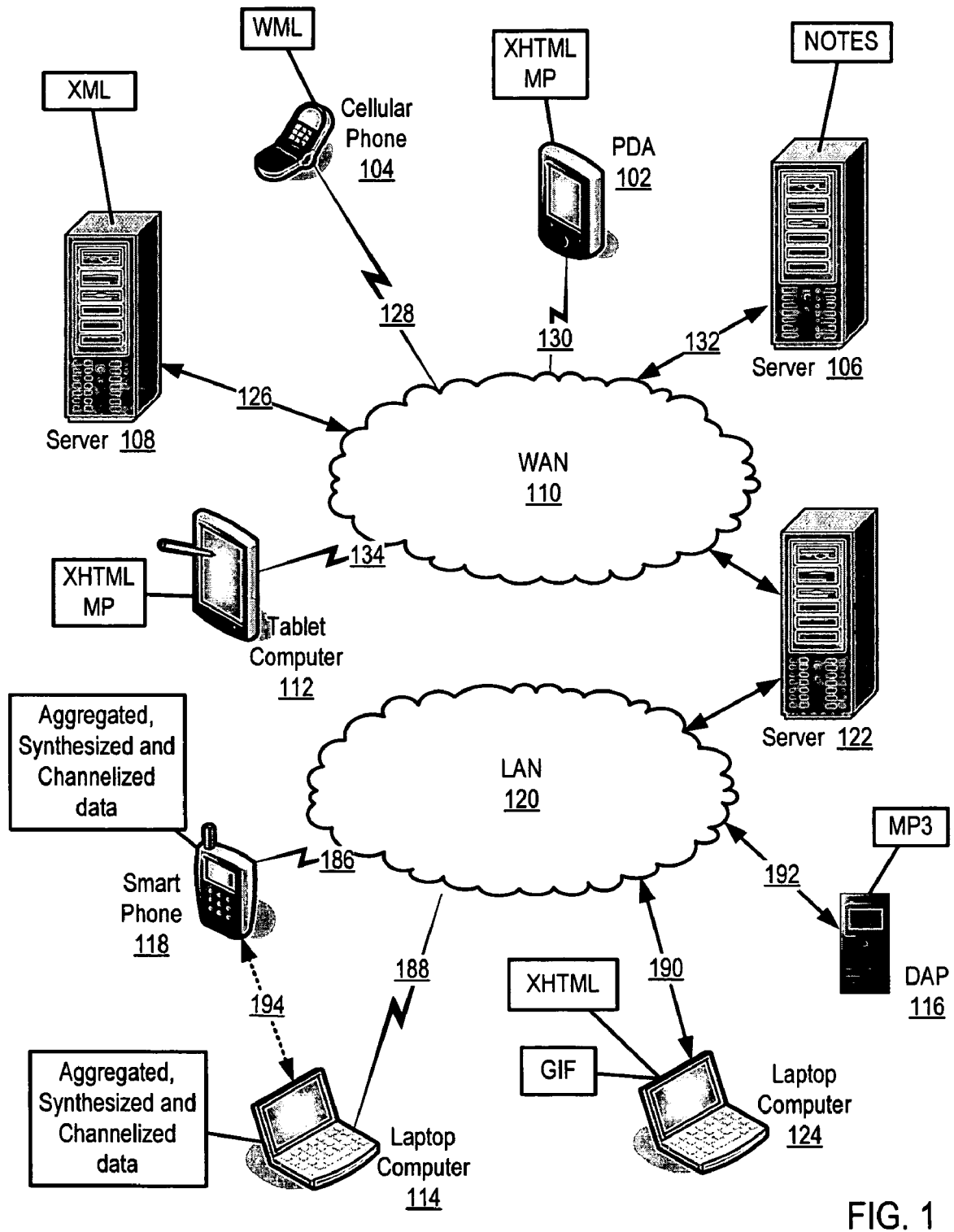
FIG. 1 sets forth a network diagram illustrating an exemplary system for data management and data rendering for disparate data types according to the present invention.

Exemplary methods, systems, and products for data management and data rendering for disparate data types and for data customization for data of disparate data types according to embodiments of the present invention are described with reference to the accompanying drawings, beginning with FIG. 1. FIG. 1 sets forth a network diagram illustrating an exemplary system for data management and data rendering for disparate data types according to embodiments of the present invention. The system of FIG. 1 operates generally to manage and render data for disparate data types according to embodiments of the present invention by aggregating data of disparate data types from disparate data sources, synthesizing the aggregated data of disparate data types into data of a uniform data type, identifying an action in dependence upon the synthesized data, and executing the identified action.

Disparate data types are data of different kind and form. That is, disparate data types are data of different kinds. The distinctions in data that define the disparate data types may include a difference in data structure, file format, protocol in which the data is transmitted, and other distinctions as will occur to those of skill in the art. Examples of disparate data types include MPEG-1 Audio Layer 3 ('MP3') files, Extensible markup language documents ('XML'), email documents, and so on as will occur to those of skill in the art. Disparate data types typically must be rendered on data type-specific devices. For example, an MPEG-1 Audio Layer 3 ('MP3') file is typically played by an MP3 player, a Wireless Markup Language ('WML') file is typically accessed by a wireless device, and so on.

The term disparate data sources means sources of data of disparate data types. Such data sources may be any device or network location capable of providing access to data of a disparate data type. Examples of disparate data sources include servers serving up files, web sites, cellular phones, PDAs, MP3 players, and so on as will occur to those of skill in the art.

The system of FIG. 1 includes a number of devices operating as disparate data sources connected for data communications in networks. The data processing system of FIG. 1 includes a wide area network ("WAN") (110) and a local area network ("LAN") (120). "LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

In the example of FIG. 1, server (122) operates as a gateway between the LAN (120) and the WAN (110). The network connection aspect of the architecture of FIG. 1 is only for explanation, not for limitation. In fact, systems for data management and data rendering for disparate data types according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, a plurality of devices are connected to a LAN and WAN respectively, each implementing a data source and each having stored upon it data of a particular data type. In the example of FIG. 1, a server (108) is connected to the WAN through a wireline connection (126). The server (108) of FIG. 1 is a data source for an RSS feed, which the server delivers in the form of an XML file. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This information is delivered as an XML file called RSS feed, webfeed, RSS stream, or RSS channel.

In the example of FIG. 1, another server (106) is connected to the WAN through a wireline connection (132). The server (106) of FIG. 1 is a data source for data stored as a Lotus NOTES file. In the example of FIG. 1, a personal digital assistant ('PDA') (102) is connected to the WAN through a wireless connection (130). The PDA is a data source for data stored in the form of an XHTML Mobile Profile ('XHTML MP') document.

In the example of FIG. 1, a cellular phone (104) is connected to the WAN through a wireless connection (128). The cellular phone is a data source for data stored as a Wireless Markup Language ('WML') file. In the example of FIG. 1, a tablet computer (112) is connected to the WAN through a wireless connection (134). The tablet computer (112) is a data source for data stored in the form of an XHTML MP document.

The system of FIG. 1 also includes a digital audio player ('DAP') (116). The DAP (116) is connected to the LAN through a wireline connection (192). The digital audio player ('DAP') (116) of FIG. 1 is a data source for data stored as an MP3 file. The system of FIG. 1 also includes a laptop computer (124). The laptop computer is connected to the LAN through a wireline connection (190). The laptop computer (124) of FIG. 1 is a data source data stored as a Graphics Interchange Format ('GIF') file. The laptop computer (124) of FIG. 1 is also a data source for data in the form of Extensible Hypertext Markup Language ('XHTML') documents.

The system of FIG. 1 includes a laptop computer (114) and a smart phone (118) each having installed upon it a data management and rendering module proving uniform access to the data of disparate data types available from the disparate data sources. The exemplary laptop computer (114) of FIG. 1 connects to the LAN through a wireless connection (188). The exemplary smart phone (118) of FIG. 1 also connects to the LAN through a wireless connection (186). The laptop computer (114) and smart phone (118) of FIG. 1 have installed and running on them software capable generally of data management and data rendering for disparate data types by aggregating data of disparate data types from disparate data sources; synthesizing the aggregated data of disparate data types into data of a uniform data type; identifying an action in dependence upon the synthesized data; and executing the identified action. The laptop computer (114) and smart phone (118) of FIG. 1 also have installed and running on them a customization module capable of receiving aggregation preferences from a user and receiving synthesis preferences from a user for data customization.

Aggregated data is the accumulation, in a single location, of data of disparate types. This location of the aggregated data may be either physical, such as, for example, on a single computer containing aggregated data, or logical, such as, for example, a single interface providing access to the aggregated data.

Synthesized data is aggregated data which has been synthesized into data of a uniform data type. The uniform data type may be implemented as text content and markup which has been translated from the aggregated data. Synthesized data may also contain additional voice markup inserted into the text content, which adds additional voice capability.

Alternatively, any of the devices of the system of FIG. 1 described as sources may also support a data management and rendering module according to the present invention. For example, the server (106), as described above, is capable of supporting a data management and rendering module providing uniform access to the data of disparate data types available from the disparate data sources. Any of the devices of FIG. 1, as described above, such as, for example, a PDA, a tablet computer, a cellular phone, or any other device as will occur to those of skill in the art, are capable of supporting a data management and rendering module according to the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

A method for data management and data rendering for disparate data types in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in data management and data rendering for disparate data types according to embodiments of the present invention. The computer (152) of FIG. 2 includes at least one computer processor (156) or 'CPU' as well as random access memory (168) ('RAM') which is connected through a system bus (160) to a processor (156) and to other components of the computer.

Stored in RAM (168) is a data management and data rendering module (140), computer program instructions for data management and data rendering for disparate data types capable generally of aggregating data of disparate data types from disparate data sources; synthesizing the aggregated data of disparate data types into data of a uniform data type; identifying an action in dependence upon the synthesized data; and executing the identified action. Data management and data rendering for disparate data types advantageously provides to the user the capability to efficiently access and manipulate data gathered from disparate data type-specific resources. Data management and data rendering for disparate data types also provides a uniform data type such that a user may access data gathered from disparate data type-specific resources on a single device.

Also stored in RAM (168) is a customization module (428), a set of computer program instructions for customizing data management and data rendering for data of disparate data types capable generally of receiving aggregation preferences from a user for use in aggregating data of disparate data types from disparate data sources in dependence upon the aggregation preferences and receiving synthesis preferences from a user for use in synthesizing the aggregated data of disparate data types into data of a uniform data type in dependence upon the synthesis preferences. Aggregation preferences are user provided preferences governing aspects of aggregating data of disparate data types. Aggregation preferences include retrieval preferences such as aggregation timing preferences that dictate to an aggregation process times to aggregate data or time periods dictating how often to aggregate data, data source preferences dictating to an aggregation process data sources from which to aggregate data, as well as other aggregation preferences as will occur to those of skill in the art. Synthesis preferences are user provided preferences governing aspects of synthesizing data of disparate data types. Synthesis preferences include preferences for synthesizing data of a particular data type, as well as preferences for other aspects of synthesizing the data such as the volume of data to synthesize, presentation formatting for the synthesized data, prosody preferences for aural presentation of the synthesized data, grammar preferences for synthesizing the data, and other preferences that will occur to those of skill in the art. Prosody preferences are preferences governing distinctive speech characteristics implemented by a voice engine such as variations of stress of syllables, intonation, timing in spoken language, variations in pitch from word to word, the rate of speech, the loudness of speech, the duration of pauses, and other distinctive speech characteristics as will occur to those of skill in the art.

Also stored in RAM (168) is an aggregation module (144), computer program instructions for aggregating data of disparate data types from disparate data sources capable generally of receiving, from an aggregation process, a request for data; identifying, in response to the request for data, one of two or more disparate data sources as a source for data; retrieving, from the identified data source, the requested data; and returning to the aggregation process the requested data. Aggregating data of disparate data types from disparate data sources advantageously provides the capability to collect data from multiple sources for synthesis.

Also stored in RAM is a synthesis engine (145), computer program instructions for synthesizing aggregated data of disparate data types into data of a uniform data type capable generally of receiving aggregated data of disparate data types and translating each of the aggregated data of disparate data types into translated data composed of text content and markup associated with the text content. Synthesizing aggregated data of disparate data types into data of a uniform data type advantageously provides synthesized data of a uniform data type which is capable of being accessed and manipulated by a single device.

Also stored in RAM (168) is an action generator module (159), a set of computer program instructions for identifying actions in dependence upon synthesized data and often user instructions. Identifying an action in dependence upon the synthesized data advantageously provides the capability of interacting with and managing synthesized data.

Also stored in RAM (168) is an action agent (158), a set of computer program instructions for administering the execution of one or more identified actions. Such execution may be executed immediately upon identification, periodically after identification, or scheduled after identification as will occur to those of skill in the art.

Also stored in RAM (168) is a dispatcher (146), computer program instructions for receiving, from an aggregation process, a request for data; identifying, in response to the request for data, one of a plurality of disparate data sources as a source for the data; retrieving, from the identified data source, the requested data; and returning, to the aggregation process, the requested data. Receiving, from an aggregation process, a request for data; identifying, in response to the request for data, one of a plurality of disparate data sources as a source for the data; retrieving, from the identified data source, the requested data; and returning, to the aggregation process, the requested data advantageously provides the capability to access disparate data sources for aggregation and synthesis.

Figure 2:
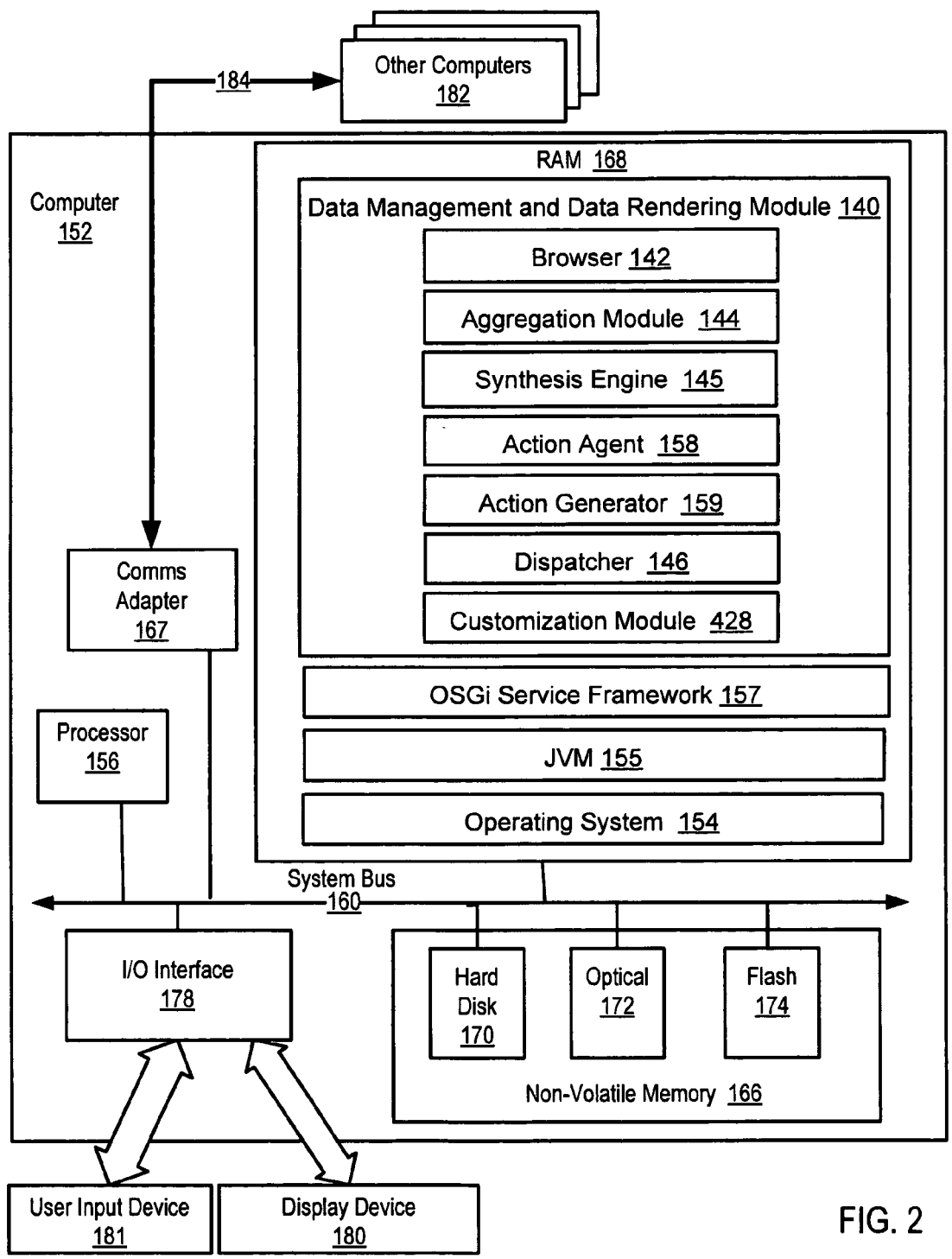
FIG. 2 sets forth a block diagram of automated computing machinery comprising an exemplary computer useful in data management and data rendering for disparate data types according to the present invention.

The dispatcher (146) of FIG. 2 also includes a plurality of plug-in modules, computer program instructions for retrieving, from a data source associated with the plug-in, requested data for use by an aggregation process. Such plug-ins isolate the general actions of the dispatcher from the specific requirements needed to retrieve data of a particular type.

Also stored in RAM (168) is a browser (142), computer program instructions for providing an interface for the user to synthesized data. Providing an interface for the user to synthesized data advantageously provides a user access to content of data retrieved from disparate data sources without having to use data source-specific devices. The browser (142) of FIG. 2 is capable of multimodal interaction capable of receiving multimodal input and interacting with users through multimodal output. Such multimodal browsers typically support multimodal web pages that provide multimodal interaction through hierarchical menus that may be speech driven.

Also stored in RAM is an OSGi Service Framework (157) running on a Java Virtual Machine ('JVM') (155). "OSGi" refers to the Open Service Gateway initiative, an industry organization developing specifications delivery of service bundles, software middleware providing compliant data communications and services through services gateways. The OSGi specification is a Java based application layer framework that gives service providers, network operator device makers, and appliance manufacturer's vendor neutral application and device layer APIs and functions. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

An OSGi service framework (157) is written in Java and therefore, typically runs on a Java Virtual Machine (JVM) (155). In OSGi, the service framework (157) is a hosting platform for running 'services'. The term 'service' or 'services' in this disclosure, depending on context, generally refers to OSGi-compliant services.

Services are the main building blocks for creating applications according to the OSGi. A service is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The service framework (157) in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

Data management and data rendering according to embodiments of the present invention may be usefully invoke one ore more OSGi services. OSGi is included for explanation and not for limitation. In fact, data management and data rendering according embodiments of the present invention may usefully employ many different technologies an all such technologies are well within the scope of the present invention.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art. The operating system (154) and data management and data rendering module (140) in the example of FIG. 2 are shown in RAM (168), but many components of such software typically are stored in non-volatile memory (166) also.

Computer (152) of FIG. 2 includes non-volatile computer memory (166) coupled through a system bus (160) to a processor (156) and to other components of the computer (152). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for data management and data rendering according to embodiments of the present invention include modems for wired dial-up communications, Ethernet (IEEE 802.3) adapters for wired network communications, and 802.11b adapters for wireless network communications.

Figure 3:
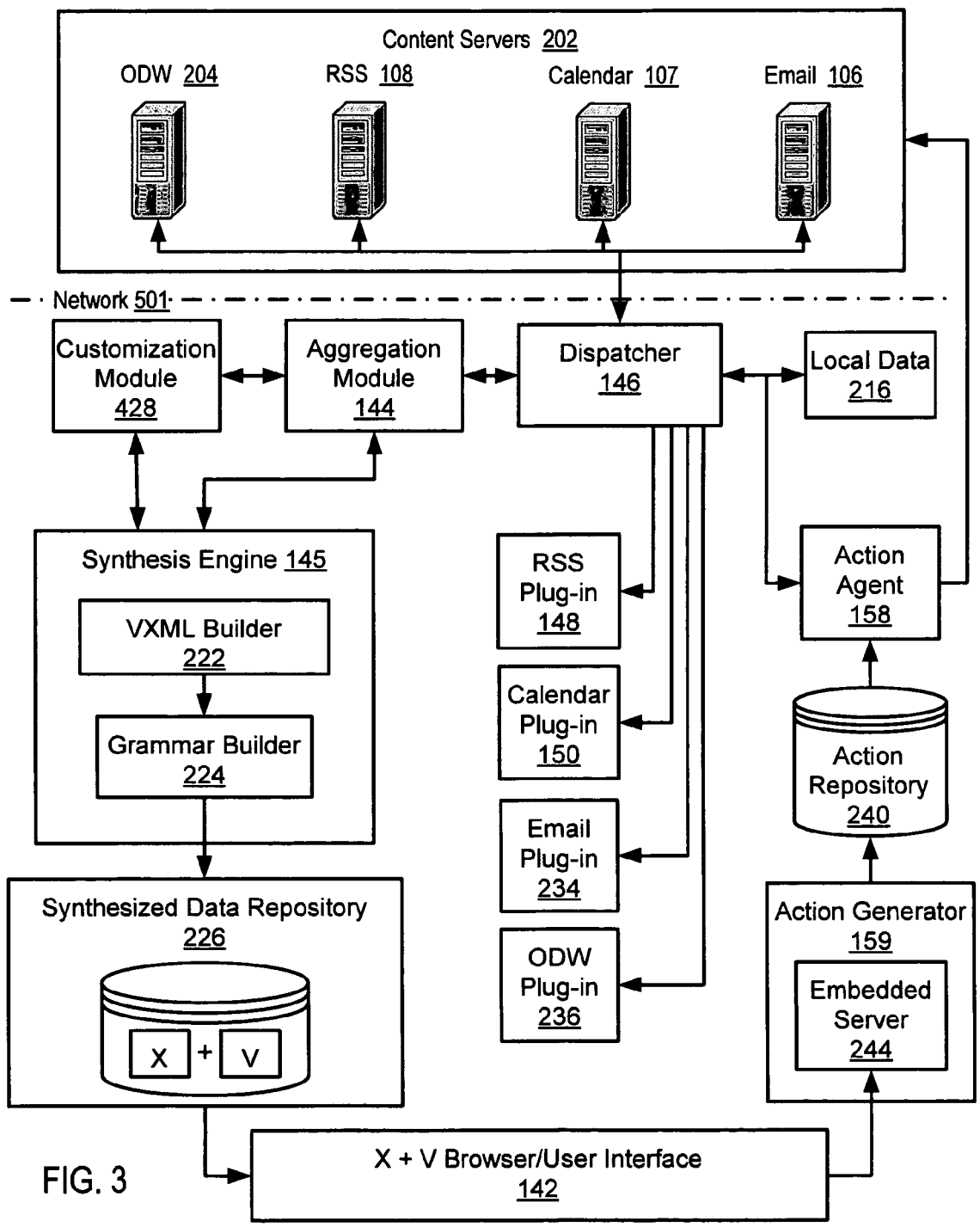
FIG. 3 sets forth a block diagram depicting a system for data management and data rendering for disparate data types according to the present invention.

For further explanation, FIG. 3 sets forth a block diagram depicting a system for data management and data rendering for disparate data types according to of the present invention. The system of FIG. 3 includes an aggregation module (144), computer program instructions for aggregating data of disparate data types from disparate data sources capable generally of receiving, from an aggregation process, a request for data; identifying, in response to the request for data, one of two or more disparate data sources as a source for data; retrieving, from the identified data source, the requested data; and returning to the aggregation process the requested data.

The system of FIG. 3 includes a synthesis engine (145), computer program instructions for synthesizing aggregated data of disparate data types into data of a uniform data type capable generally of receiving aggregated data of disparate data types and translating each of the aggregated data of disparate data types into translated data composed of text content and markup associated with the text content.

The synthesis engine (145) includes a VXML Builder (222) module, computer program instructions for translating each of the aggregated data of disparate data types into text content and markup associated with the text content. The synthesis engine (145) also includes a grammar builder (224) module, computer program instructions for generating grammars for voice markup associated with the text content.

The system of FIG. 3 also includes a customization module (428), a set of computer program instructions for customizing data management and data rendering for data of disparate data types capable generally of receiving aggregation preferences from a user for use in aggregating data of disparate data types from disparate data sources in dependence upon the aggregation preferences and receiving synthesis preferences from a user for use in synthesizing the aggregated data of disparate data types into data of a uniform data type in dependence upon the synthesis preferences. Customizing data management and data rendering for data of disparate data types advantageously provides improved access to data based upon the particular user's own preferences.

The system of FIG. 3 includes a synthesized data repository (226), data storage for the synthesized data created by the synthesis engine in X+V format. The system of FIG. 3 also includes an X+V browser (142), computer program instructions capable generally of presenting the synthesized data from the synthesized data repository (226) to the user. Presenting the synthesized data may include both graphical display and audio representation of the synthesized data. As discussed below with reference to FIG. 4, one way presenting the synthesized data to a user may be carried out is by presenting synthesized data through one or more channels.

The system of FIG. 3 includes a dispatcher (146) module, computer program instructions for receiving, from an aggregation process, a request for data; identifying, in response to the request for data, one of a plurality of disparate data sources as a source for the data; retrieving, from the identified data source, the requested data; and returning, to the aggregation process, the requested data. The dispatcher (146) module accesses data of disparate data types from disparate data sources for the aggregation module (144), the synthesis engine (145), and the action agent (158). The system of FIG. 3 includes data source-specific plug-ins (148-150, 234-236) used by the dispatcher to access data as discussed below.

In the system of FIG. 3, the data sources include local data (216) and content servers (202). Local data (216) is data contained in memory or registers of the automated computing machinery. In the system of FIG. 3, the data sources also include content servers (202). The content servers (202) are connected to the dispatcher (146) module through a network (501). An RSS server (108) of FIG. 3 is a data source for an RSS feed, which the server delivers in the form of an XML file. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This information is delivered as an XML file called RSS feed, webfeed, RSS stream, or RSS channel.

In the system of FIG. 3, an email server (106) is a data source for email. The server delivers this email in the form of a Lotus NOTES file. In the system of FIG. 3, a calendar server (107) is a data source for calendar information. Calendar information includes calendared events and other related information. The server delivers this calendar information in the form of a Lotus NOTES file.

In the system of FIG. 3, an IBM On Demand Workstation (204) a server providing support for an On Demand Workplace ('ODW') that provides productivity tools, and a virtual space to share ideas and expertise, collaborate with others, and find information.

The system of FIG. 3 includes data source-specific plug-ins (148-150, 234-236). For each data source listed above, the dispatcher uses a specific plug-in to access data.

The system of FIG. 3 includes an RSS plug-in (148) associated with an RSS server (108) running an RSS application. The RSS plug-in (148) of FIG. 3 retrieves the RSS feed from the RSS server (108) for the user and provides the RSS feed in an XML file to the aggregation module.

The system of FIG. 3 includes a calendar plug-in (150) associated with a calendar server (107) running a calendaring application. The calendar plug-in (150) of FIG. 3 retrieves calendared events from the calendar server (107) for the user and provides the calendared events to the aggregation module.

The system of FIG. 3 includes an email plug-in (234) associated with an email server (106) running an email application. The email plug-in (234) of FIG. 3 retrieves email from the email server (106) for the user and provides the email to the aggregation module.

The system of FIG. 3 includes an On Demand Workstation ('ODW') plug-in (236) associated with an ODW server (204) running an ODW application. The ODW plug-in (236) of FIG. 3 retrieves ODW data from the ODW server (204) for the user and provides the ODW data to the aggregation module.

The system of FIG. 3 also includes an action generator module (159), computer program instructions for identifying an action from the action repository (240) in dependence upon the synthesized data capable generally of receiving a user instruction, selecting synthesized data in response to the user instruction, and selecting an action in dependence upon the user instruction and the selected data.

The action generator module (159) contains an embedded server (244). The embedded server (244) receives user instructions through the X+V browser (142). Upon identifying an action from the action repository (240), the action generator module (159) employs the action agent (158) to execute the action. The system of FIG. 3 includes an action agent (158), computer program instructions for executing an action capable generally of executing actions.

Figure 4:
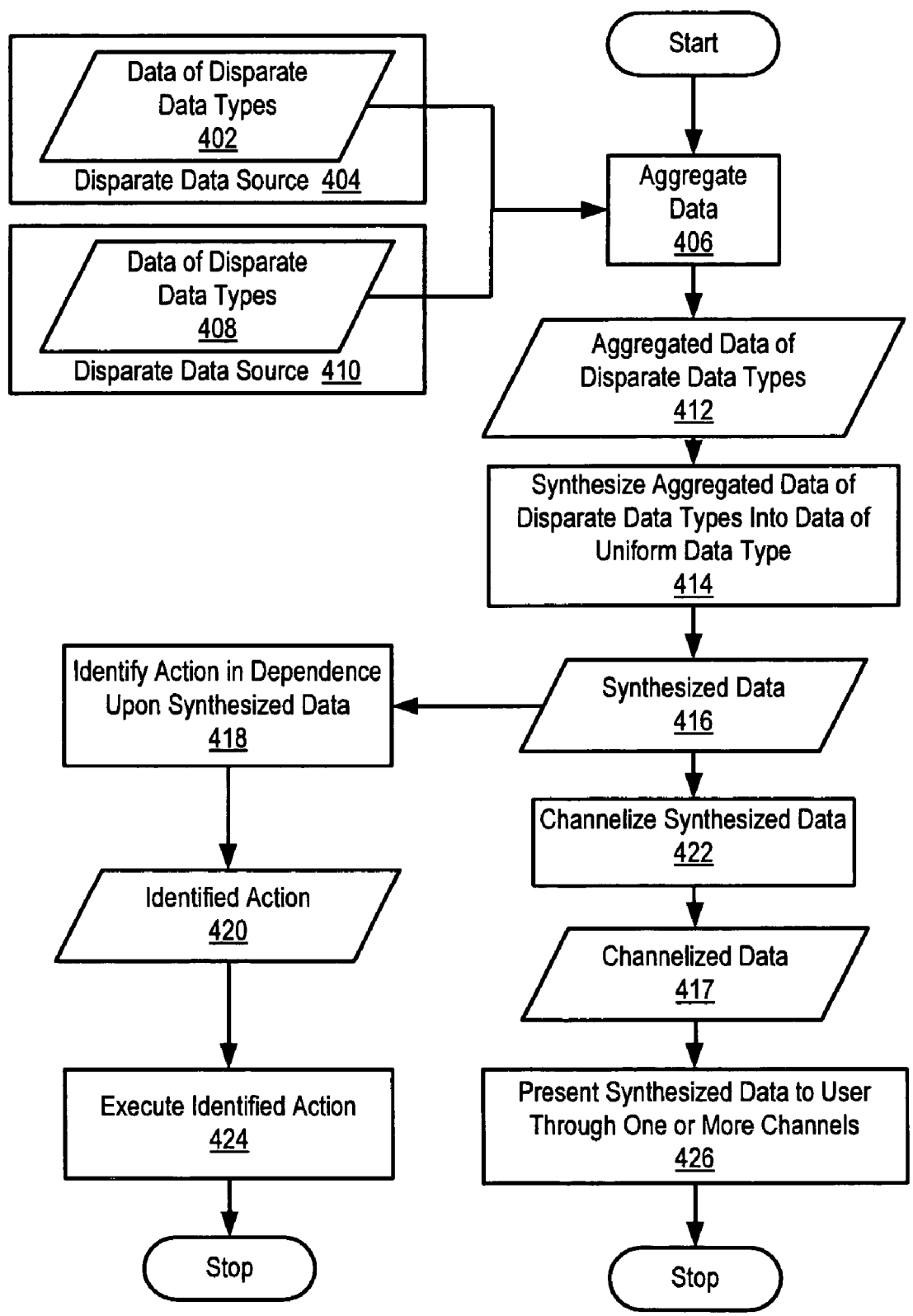
FIG. 4 sets forth a flow chart illustrating an exemplary method for data management and data rendering for disparate data types according to the present invention.

For further explanation, FIG. 4 sets forth a flow chart illustrating an exemplary method for data management and data rendering for disparate data types according to embodiments of the present invention. The method of FIG. 4 includes aggregating (406) data of disparate data types (402, 408) from disparate data sources (404, 410). As discussed above, aggregated data of disparate data types is the accumulation, in a single location, of data of disparate types. This location of the aggregated data may be either physical, such as, for example, on a single computer containing aggregated data, or logical, such as, for example, a single interface providing access to the aggregated data.

Figure 5:
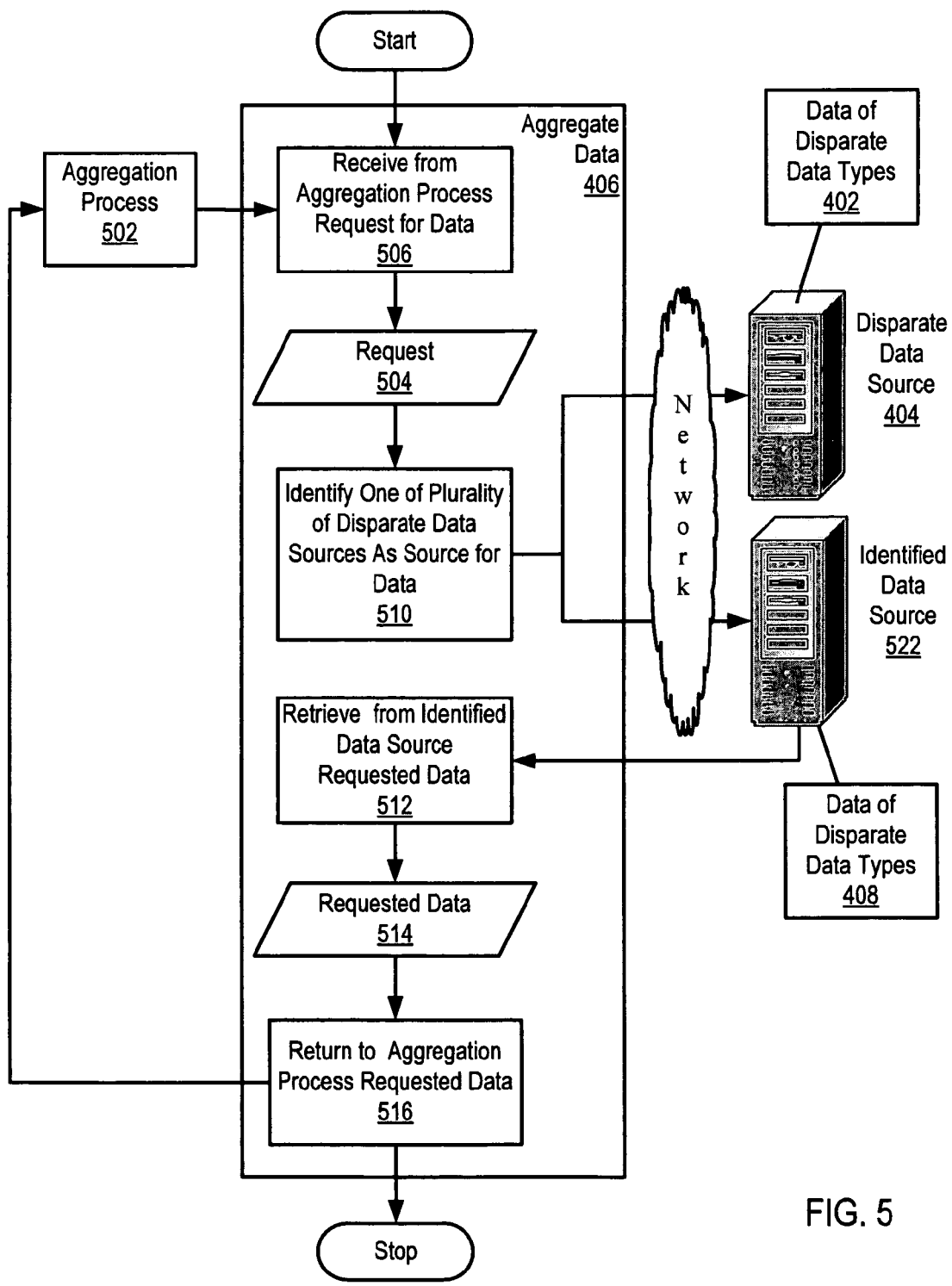
FIG. 5 sets forth a flow chart illustrating an exemplary method for aggregating data of disparate data types from disparate data sources according to the present invention.

Aggregating (406) data of disparate data types (402, 408) from disparate data sources (404, 410) according to the method of FIG. 4 may be carried out by receiving, from an aggregation process, a request for data; identifying, in response to the request for data, one of two or more disparate data sources as a source for data; retrieving, from the identified data source, the requested data; and returning to the aggregation process the requested data as discussed in more detail below with reference to FIG. 5.

The method of FIG. 4 also includes synthesizing (414) the aggregated data of disparate data types (412) into data of a uniform data type. Data of a uniform data type is data having been created or translated into a format of predetermined type. That is, uniform data types are data of a single kind that may be rendered on a device capable of rendering data of the uniform data type. Synthesizing (414) the aggregated data of disparate data types (412) into data of a uniform data type advantageously results in a single point of access for the content of the aggregation of disparate data retrieved from disparate data sources.

One example of a uniform data type useful in synthesizing (414) aggregated data of disparate data types (412) into data of a uniform data type is XHTML plus Voice. XHTML plus Voice ('X+V') is a Web markup language for developing multimodal applications, by enabling voice in a presentation layer with voice markup. X+V provides voice-based interaction in small and mobile devices using both voice and visual elements. X+V is composed of three main standards: XHTML, VoiceXML, and XML Events. Given that the Web application environment is event-driven, X+V incorporates the Document Object Model (DOM) eventing framework used in the XML Events standard. Using this framework, X+V defines the familiar event types from HTML to create the correlation between visual and voice markup.

Synthesizing (414) the aggregated data of disparate data types (412) into data of a uniform data type may be carried out by receiving aggregated data of disparate data types and translating each of the aggregated data of disparate data types into text content and markup associated with the text content as discussed in more detail with reference to FIG. 9. In the method of FIG. 4, synthesizing the aggregated data of disparate data types (412) into data of a uniform data type may be carried out by translating the aggregated data into X+V, or any other markup language as will occur to those of skill in the art.

The method for data management and data rendering of FIG. 4 also includes identifying (418) an action in dependence upon the synthesized data (416). An action is a set of computer instructions that when executed carry out a predefined task. The action may be executed in dependence upon the synthesized data immediately or at some defined later time. Identifying (418) an action in dependence upon the synthesized data (416) may be carried out by receiving a user instruction, selecting synthesized data in response to the user instruction, and selecting an action in dependence upon the user instruction and the selected data.

A user instruction is an event received in response to an act by a user. Exemplary user instructions include receiving events as a result of a user entering a combination of keystrokes using a keyboard or keypad, receiving speech from a user, receiving an event as a result of clicking on icons on a visual display by using a mouse, receiving an event as a result of a user pressing an icon on a touchpad, or other user instructions as will occur to those of skill in the art. Receiving a user instruction may be carried out by receiving speech from a user, converting the speech to text, and determining in dependence upon the text and a grammar the user instruction. Alternatively, receiving a user instruction may be carried out by receiving speech from a user and determining the user instruction in dependence upon the speech and a grammar.

The method of FIG. 4 also includes executing (424) the identified action (420). Executing (424) the identified action (420) may be carried out by calling a member method in an action object identified in dependence upon the synthesized data, executing computer program instructions carrying out the identified action, as well as other ways of executing an identified action as will occur to those of skill in the art. Executing (424) the identified action (420) may also include determining the availability of a communications network required to carry out the action and executing the action only if the communications network is available and postponing executing the action if the communications network connection is not available. Postponing executing the action if the communications network connection is not available may include enqueuing identified actions into an action queue, storing the actions until a communications network is available, and then executing the identified actions. Another way that waiting to execute the identified action (420) may be carried out is by inserting an entry delineating the action into a container, and later processing the container. A container could be any data structure suitable for storing an entry delineating an action, such as, for example, an XML file.

Executing (424) the identified action (420) may include modifying the content of data of one of the disparate data sources. Consider for example, an action called deleteOldEmail( ) that when executed deletes not only synthesized data translated from email, but also deletes the original source email stored on an email server coupled for data communications with a data management and data rendering module operating according to the present invention.

The method of FIG. 4 also includes channelizing (422) the synthesized data (416). A channel is a logical aggregation of data content for presentation to a user. Channelizing (422) the synthesized data (416) may be carried out by identifying attributes of the synthesized data, characterizing the attributes of the synthesized data, and assigning the data to a predetermined channel in dependence upon the characterized attributes and channel assignment rules. Channelizing the synthesized data advantageously provides a vehicle for presenting related content to a user. Examples of such channelized data may be a 'work channel' that provides a channel of work related content, an 'entertainment channel' that provides a channel of entertainment content an so on as will occur to those of skill in the art.

The method of FIG. 4 may also include presenting (426) the synthesized data (416) to a user through one or more channels. One way presenting (426) the synthesized data (416) to a user through one or more channels may be carried out is by presenting summaries or headings of available channels. The content presented through those channels can be accessed via this presentation in order to access the synthesized data (416). Another way presenting (426) the synthesized data (416) to a user through one or more channels may be carried out by displaying or playing the synthesized data (416) contained in the channel. Text data may be displayed visually, or translated for aural presentation to the user.

As discussed above, data management and data rendering for data of disparate data may be further customized by receiving aggregation preferences from a user for use in aggregating data of disparate data types from disparate data sources in dependence upon the aggregation preferences and receiving synthesis preferences from a user for use in synthesizing the aggregated data of disparate data types into data of a uniform data type in dependence upon the synthesis preferences. Customizing data management and data rendering for data of disparate data types advantageously provides improved access to data based upon the particular user's own preferences.

Figure 4A:
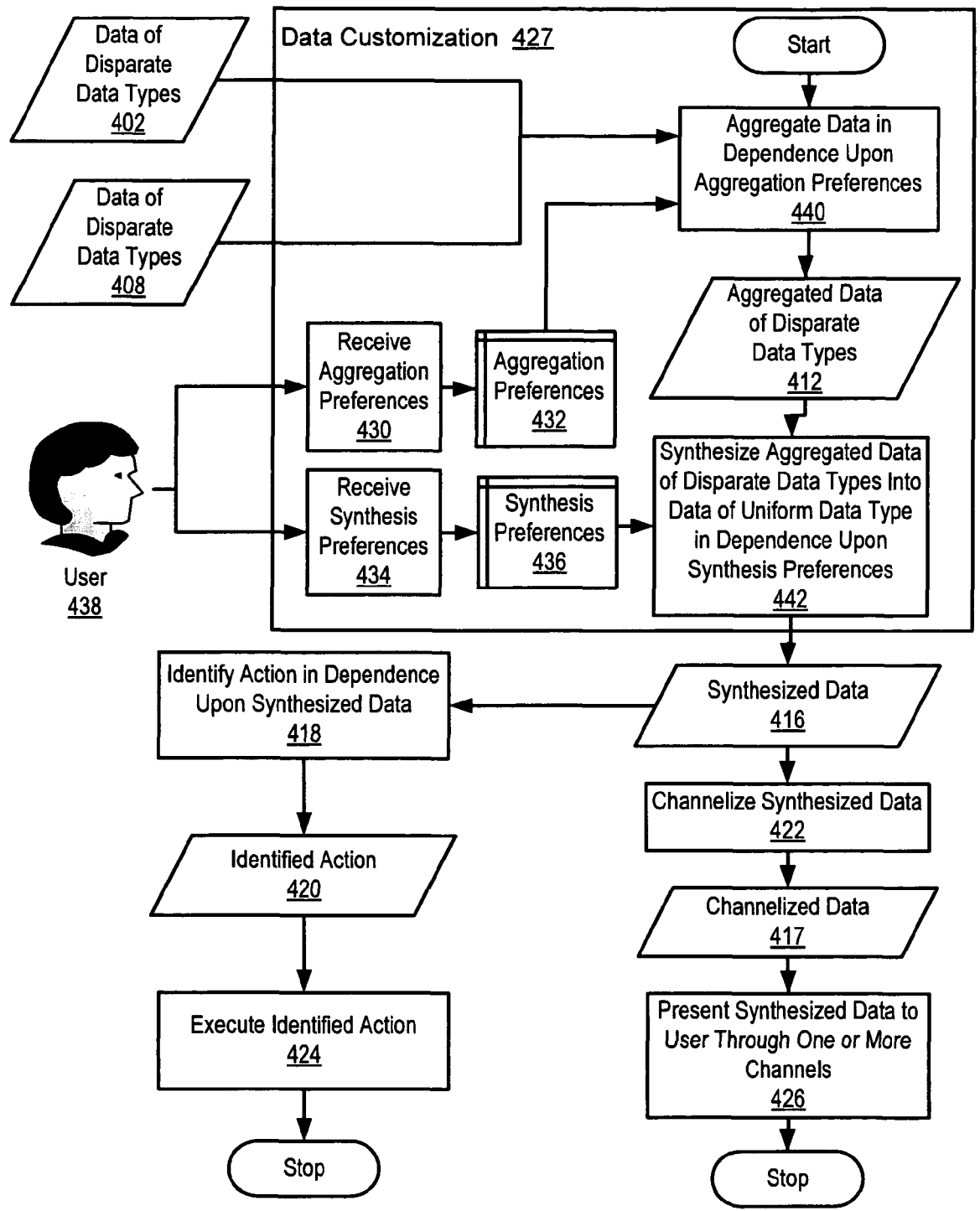
FIG. 4A sets forth a flow chart illustrating an exemplary method for data management and data rendering for disparate data types according to the present invention.

For further explanation, FIG. 4A sets forth a flow chart illustrating an exemplary method for data management and data rendering for disparate data types according to embodiments of the present invention that also includes data customization (427) for data of disparate data types (402, 408). As discussed above, disparate data types are data of different kind and form. That is, disparate data types are data of different kinds. The distinctions in data that define the disparate data types may include a difference in data structure, file format, protocol in which the data is transmitted, and other distinctions as will occur to those of skill in the art.

In the method of FIG. 4A data customization (427) for data of disparate data types (402, 408) includes receiving (430) aggregation preferences (432) from a user (438). Aggregation preferences (432) are user provided preferences governing aspects of aggregating data of disparate data types. Examples of aggregation preferences include aggregation timing preferences that dictate to an aggregation process times to aggregate data or time periods dictating how often to aggregate data, data source preferences dictating to an aggregation process data sources from which to aggregate data, as well as other aggregation preferences as will occur to those of skill in the art.

Receiving (430) aggregation preferences (432) from a user (438) may be carried out by receiving from the user a user instruction selecting predefined aggregation preferences and storing the aggregation preferences selected by the user in a configurations file. Such stored aggregation preferences in a configurations file is available for use in aggregating data of disparate data types from disparate data sources in dependence upon the aggregation preferences. Examples of predefined aggregation preferences may include retrieval preferences such as aggregation timing preferences dictating to an aggregation process times to aggregate data or dictating to an aggregation process period timing requirements defining how often data is aggregated. To select predefined aggregation preferences users may access aggregation preference selections screens through for example a browser in a data management and data rendering module. Aggregation preference selection screens are typically capable of receiving user instructions for selecting predefined aggregation preferences by providing a list of predefined aggregation preferences and receiving a user instruction selecting one of the presented preferences.

Receiving (430) aggregation preferences (432) from a user (438) may also be carried out by receiving from the user a user instruction identifying an aggregation preferences that is not predefined and storing the aggregation preferences selected by the user in a configurations file. An example of an aggregation preference that is not predefined includes data source preferences dictating to an aggregation process data sources from which to aggregate data. Aggregation preferences stored in a configurations file are available for use in aggregating data of disparate data types from disparate data sources in dependence upon the aggregation preferences. To select aggregation preferences that are not predefined users may access aggregation preference selection screens through, for example, a browser in a data management and data rendering module. Aggregation preference selection screens are typically capable of receiving user instructions for selecting aggregation preferences that are not defined by providing, for example, a GUI input box for receiving a user instruction.

Figure 4B:
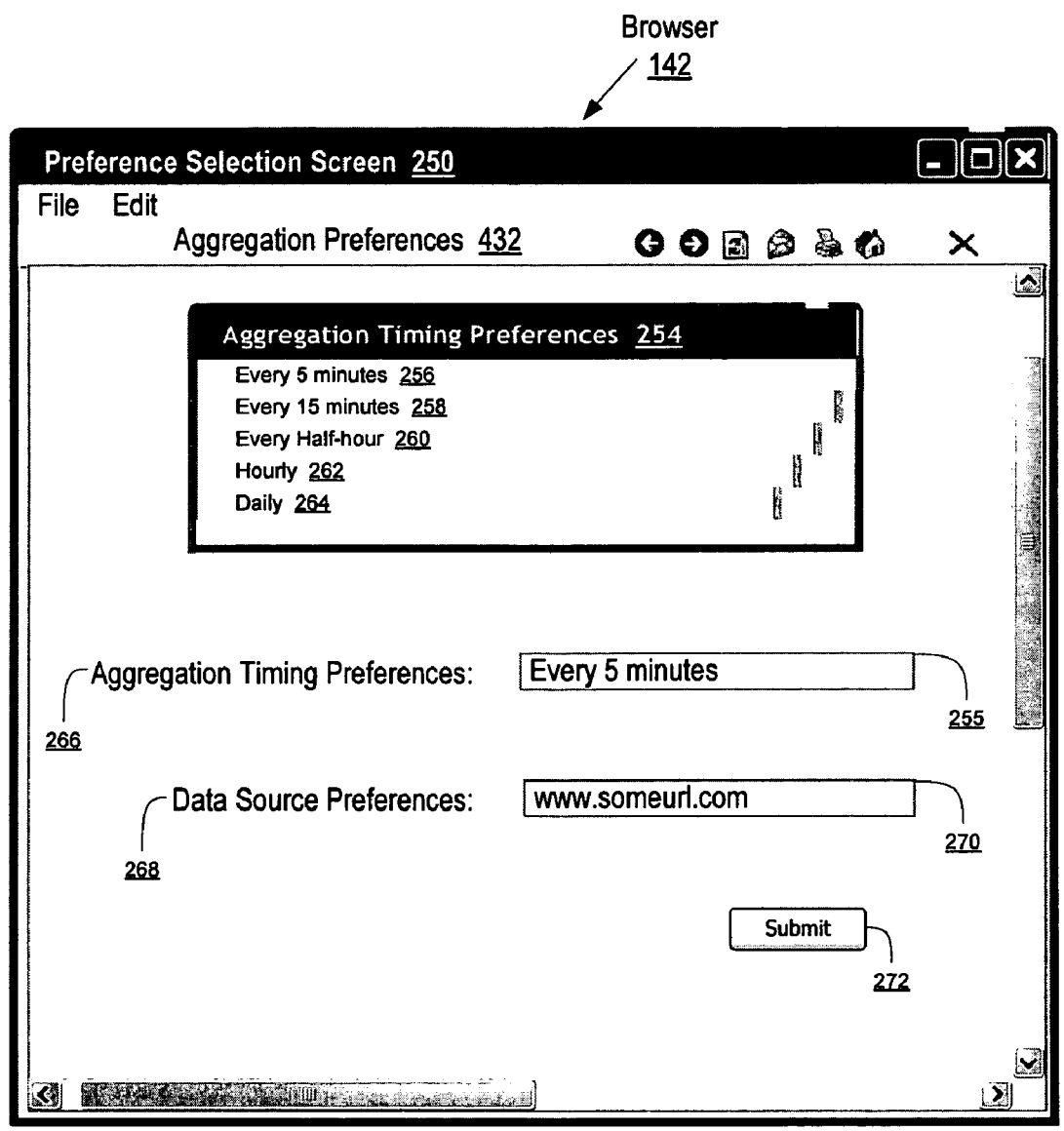
FIG. 4B sets forth a line drawing of a browser in a data management and data rendering module operating according to the present invention.

For further explanation, FIG. 4B sets forth a line drawing of a browser (142) in a data management and data rendering module operating in accordance with the method of FIG. 4A and displaying a preference selection screen (250). The preference selection screen (250) of FIG. 4B designed to receive aggregation preferences (432) from a user. As discussed above, receiving aggregation preferences (432) from a user may be carried out by receiving from the user a user instruction selecting predefined aggregation preferences. The exemplary preference selection screen (250) includes an input widget (254) displaying predefined menu choices (256-264) for an aggregation timing preference (254), which is one of the available aggregation preferences (432). The input widget of FIG. 4B is a GUI widget that accepts inputs through a user's mouse click on one of the predefined aggregation timing preferences displayed in the menu (254). The predefined menu choices for the displayed aggregation timing preference (254) includes aggregating: 'every 5 minutes' (256), 'every 15 minutes' (258), 'every half-hour' (260), 'hourly' (262), or 'daily' (264). The exemplary preference selection screen (250) of FIG. 4B also displays text describing the selected aggregation timing preference (254) in a text box (255). In this example, a user has selected an aggregation timing preference (254) of every 5 minutes (256).

As discussed above, receiving aggregation preferences (432) from a user may also be carried out by receiving from the user a user instruction identifying an aggregation preference that is not predefined. The exemplary preference selection screen (250) also has a GUI input box (270) for receiving, from a user, a user instruction identifying a data source preference (268), which, in the preference selection screen (250) of FIG. 4B, is an aggregation preference that is not predefined. The exemplary preference selection screen (250) also displays the text of the user instruction received through the GUI input box (270) describing the data source preference (268). In this example, a user has selected a data source preference (268) of www.someurl.com. The exemplary preference selection screen (250) also has a button (272) which accepts a user instruction through a mouse click to submit selected aggregation preferences (432) from a user to a data management and data rendering module for storage in a user configurations file.

Again with reference to FIG. 4A: Data customization for data of disparate data types (402, 408) also includes receiving (434) synthesis preferences (436) from a user (438). Synthesis preferences (436) are user provided preferences governing aspects of synthesizing data of disparate data types. Synthesis preferences include preferences for synthesizing data of a particular data type, as well as preferences for other aspects of synthesizing the data such as the volume of data to synthesize, presentation formatting for the synthesized data, prosody preferences for aural presentation of the synthesized data, grammar preferences for synthesizing the data, and other preferences that will occur to those of skill in the art. Prosody preferences are preferences governing distinctive speech characteristics implemented by a voice engine such as variations of stress of syllables, intonation, timing in spoken language, variations in pitch from word to word, the rate of speech, the loudness of speech, the duration of pauses, and other distinctive speech characteristics as will occur to those of skill in the art.

Receiving (434) synthesis preferences (436) from a user (438) may be carried out by receiving from the user a user instruction selecting predefined synthesis preferences and storing the synthesis preferences selected by the user in a configurations file. Such stored synthesis preferences in a configurations file are available for use in synthesizing data of disparate data types from disparate data sources in dependence upon the synthesis preferences. Examples of predefined synthesis preferences include preferences for synthesizing data of a particular data type, presentation formatting for the synthesized data, prosody preferences for aural presentation of the synthesized data and others as will occur to those of skill in the art. For further explanation consider an example of synthesizing email. Email data may be synthesized according to a predefined synthesis preference to be presented orally with the use of a female voice that reads first who the email is from followed by the date and time that the email arrived followed by the content of the email message. To select predefined synthesis preferences users may access synthesis preference selection screens through for example a browser in a data management and data rendering module. Synthesis preference selection screens are typically capable of receiving user instructions for selecting predefined synthesis preferences by providing a list of predefined synthesis preferences and receiving a user instruction selecting one of the presented preferences.

Receiving (434) synthesis preferences (436) from a user (438) may also be carried out by receiving from the user a user instruction identifying synthesis preferences that are not predefined and storing the synthesis preferences selected by the user in a configurations file. Examples of synthesis preferences that may not be predefined include volume preferences indicating the volume of data to synthesize and grammar preferences indicating specific words for inclusion in grammars associated with the synthesized data. Synthesis preferences stored in a configurations file are available for use in synthesizing data of disparate data types from disparate data sources in dependence upon the synthesis preferences. To select synthesis preferences that are not predefined users may access synthesis preference selection screens through, for example, a browser in a data management and data rendering module. Synthesis preference selection screens are typically capable of receiving user instructions for selecting synthesis preferences that are not defined by providing, for example, a GUI input box for receiving a user instruction.

Figure 4C:
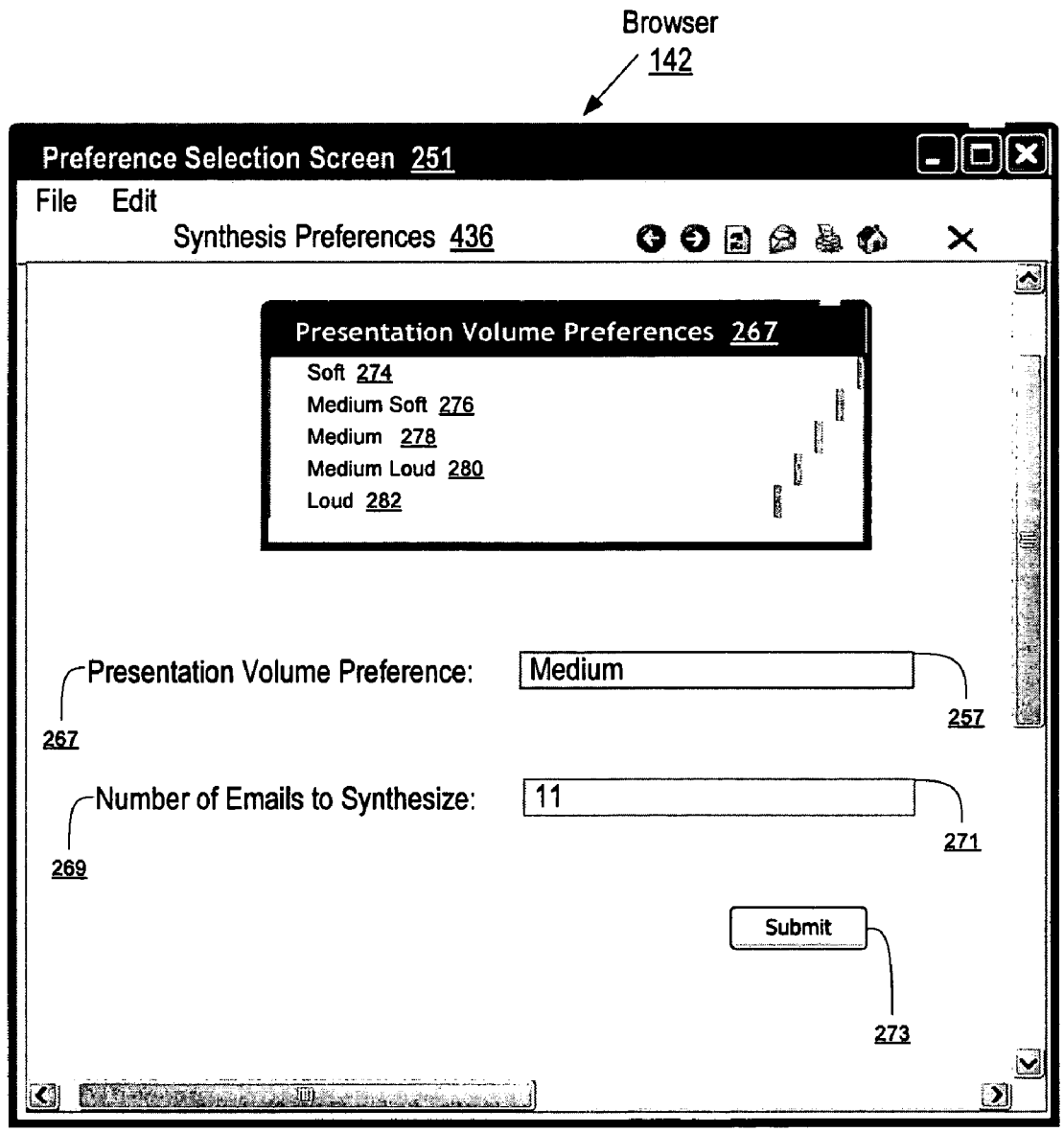
FIG. 4C sets forth a line drawing of a browser in a data management and data rendering module further operating in according to the present invention.

For further explanation, FIG. 4C sets forth a line drawing of a browser (142) in a data management and data rendering module operating in accordance with the method of FIG. 4A and displaying a preference selection screen (251). The preference selection screen (251) of FIG. 4C is designed to receive synthesis preferences (436) from a user. As discussed above, receiving synthesis preferences (436) from a user may be carried out by receiving from the user a user instruction selecting predefined aggregation preferences. The exemplary preference selection screen (251) includes an input widget (267) displaying predefined menu choices for presentation volume preferences (274-282) defining the volume at which a voice engine presents the synthesized data to a user. The input widget of FIG. 4C is a GUI widget that accepts a user selection of one of the displayed presentation volume preferences through a mouse click on the display of the selected presentation volume preference inputs. The menu choices include the volumes of 'soft' (274), 'medium soft' (276), 'medium' (278), 'medium loud' (280), or 'loud' (282). The exemplary preference selection screen (251) also displays text describing the presentation volume preferences (267) in a text box (257). In this example, a user has selected a presentation volume preference (267) of medium (278).

As discussed above, receiving synthesis preferences (436) from a user may also be carried out by receiving from the user a user instruction identifying an aggregation preference that is not predefined. The exemplary preference selection screen (251) also has a GUI input box (271) for receiving from a user a user instruction identifying a number of emails to synthesize (269) preference, which, in the preference selection screen (251) of FIG. 4C, is a synthesis preference that is not predefined. The exemplary preference selection screen (251) also displays in a text box (271) the text of the user instruction describing the user's preference for the number of emails to synthesize (269). In this example, a user has selected 11 as the number of emails to synthesize (269). The exemplary preference selection screen (251) also has a button (273), labeled 'submit', which receives a user instruction through a mouse click to submit selected synthesis preferences (436) to a data management and data rendering module for storage in a configurations file.

Again with reference to FIG. 4A: Data customization for data of disparate data types (402, 408) according to the method of FIG. 4A includes aggregating (440) data of disparate data types (402, 408) from disparate data sources in dependence upon the aggregation preferences (432). As discussed above, aggregated data of disparate data types is the accumulation, in a single location, of data of disparate types. This location of the aggregated data may be either physical, such as, for example, on a single computer containing aggregated data, or logical, such as, for example, a single interface providing access to the aggregated data.

Aggregating (440) data of disparate data types (402, 408) from disparate data sources in dependence upon the aggregation preferences (432) according to the method of FIG. 4 may be carried out by receiving, from an aggregation process, a request for data; identifying, in response to the request for data, one of two or more disparate data sources as a source for data; retrieving user preferences; and retrieving, from the identified data source, the requested data in accordance with the user preferences; and returning to the aggregation process the requested data as discussed in more detail below with reference to FIG. 5.

Data customization for data of disparate data types (402, 408) according to the method of FIG. 4A includes synthesizing (442) the aggregated data of disparate data types (412) into data of a uniform data type in dependence upon the synthesis preferences (436). Data of a uniform data type is data having been created or translated into a format of predetermined type. That is, uniform data types are data of a single kind that may be rendered on a device capable of rendering data of the uniform data type. Synthesizing (442) the aggregated data of disparate data types (412) into data of a uniform data type in dependence upon the synthesis preferences (436) may be carried out by receiving aggregated data of disparate data types, retrieving synthesis preferences, and translating each of the aggregated data of disparate data types into text content and markup associated with the text content in dependence upon the synthesis preferences as discussed in more detail with reference to FIG. 10.

For further explanation, FIG. 5 sets forth a flow chart illustrating an exemplary method for aggregating data of disparate data types from disparate data sources according to embodiments of the present invention. In the method of FIG. 5, aggregating (406) data of disparate data types (402, 408) from disparate data sources (404, 522) includes receiving (506), from an aggregation process (502), a request (504) for data. A request for data may be implemented as a message, from the aggregation process, to a dispatcher instructing the dispatcher to initiate retrieving the requested data and returning the requested data to the aggregation process.

In the method of FIG. 5, aggregating (406) data of disparate data types (402, 408) from disparate data sources (404, 522) also includes identifying (510), in response to the request (504) for data, one of a plurality of disparate data sources (404, 522) as a source for the data. Identifying (510), in response to the request (504) for data, one of a plurality of disparate data sources (404, 522) as a source for the data may be carried out in a number of ways. One way of identifying (510) one of a plurality of disparate data sources (404, 522) as a source for the data may be carried out by receiving, from a user, an identification of the disparate data source; and identifying, to the aggregation process, the disparate data source in dependence upon the identification as discussed in more detail below with reference to FIG. 7.

Another way of identifying, to the aggregation process (502), disparate data sources is carried out by identifying, from the request for data, data type information and identifying from the data source table sources of data that correspond to the data type as discussed in more detail below with reference to FIG. 8. Still another way of identifying one of a plurality of data sources is carried out by identifying, from the request for data, data type information; searching, in dependence upon the data type information, for a data source; and identifying from the search results returned in the data source search, sources of data corresponding to the data type also discussed below in more detail with reference to FIG. 8.

The three methods for identifying one of a plurality of data sources described in this specification are for explanation and not for limitation. In fact, there are many ways of identifying one of a plurality of data sources and all such ways are well within the scope of the present invention.

The method for aggregating (406) data of FIG. 5 includes retrieving (512), from the identified data source (522), the requested data (514). Retrieving (512), from the identified data source (522), the requested data (514) includes determining whether the identified data source requires data access information to retrieve the requested data; retrieving, in dependence upon data elements contained in the request for data, the data access information if the identified data source requires data access information to retrieve the requested data; and presenting the data access information to the identified data source as discussed in more detail below with reference to FIG. 6. Retrieving (512) the requested data according the method of FIG. 5 may be carried out by retrieving the data from memory locally, downloading the data from a network location, or any other way of retrieving the requested data that will occur to those of skill in the art. As discussed above, retrieving (512), from the identified data source (522), the requested data (514) may be carried out by a data-source-specific plug-in designed to retrieve data from a particular data source or a particular type of data source.

In the method of FIG. 5, aggregating (406) data of disparate data types (402, 408) from disparate data sources (404, 522) also includes returning (516), to the aggregation process (502), the requested data (514). Returning (516), to the aggregation process (502), the requested data (514) returning the requested data to the aggregation process in a message, storing the data locally and returning a pointer pointing to the location of the stored data to the aggregation process, or any other way of returning the requested data that will occur to those of skill in the art.

As discussed above, aggregation preferences are user provided preferences governing aspects of aggregating data of disparate data types. Aggregation preferences are useful in customization for data of disparate data types according to embodiments of the present invention. For further explanation therefore, FIG. 5A sets forth a flow chart illustrating an exemplary method for aggregating data of disparate data types from disparate data sources in dependence upon the aggregation preferences according to embodiments of the present invention that includes receiving (430) aggregation preferences (432). As discussed above, aggregation preferences (432) are user provided preferences governing aspects of aggregating data of disparate data types. Examples of aggregation preferences include retrieval preferences such as aggregation timing preferences that dictate to an aggregation process times to aggregate data or time periods dictating how often to aggregate data, data source preferences dictating to an aggregation process data sources from which to aggregate data, as well as other aggregation preferences as will occur to those of skill in the art.

Figure 5A:
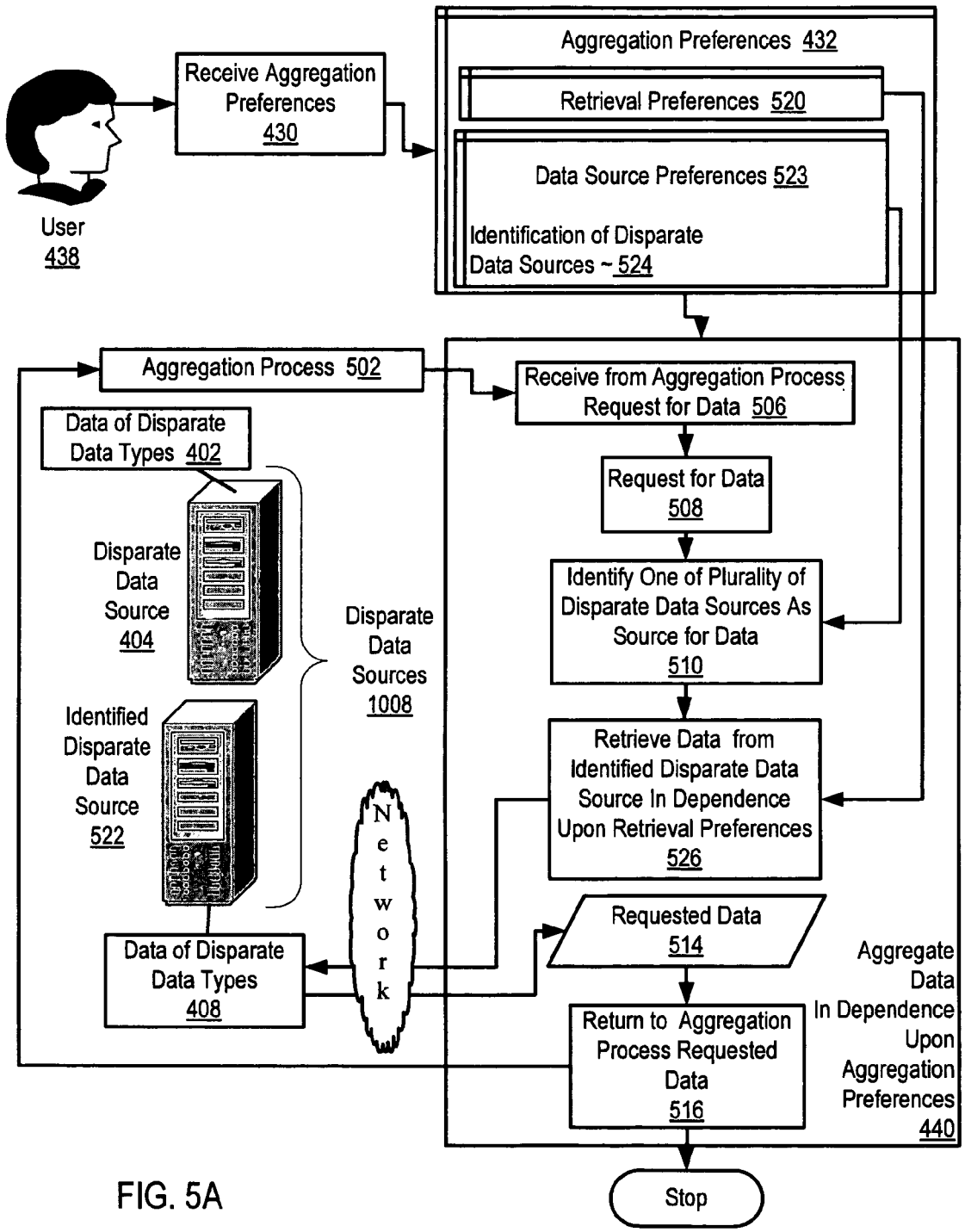
FIG. 5A sets forth a flow chart illustrating an exemplary method for aggregating data of disparate data types from disparate data sources in dependence upon the aggregation preferences according to the present invention.

The exemplary aggregation preferences (432) of FIG. 5A include retrieval preferences (520). Retrieval preferences (520) are user defined preferences governing retrieval of data from an identified data source. Such retrieval preferences may include aggregation timing preferences that dictate times to aggregate data or time periods defining how often to aggregate data. Retrieval preferences may also include other preferences such as triggering preferences dictating to an aggregation process to aggregate data upon a triggering event such as an event identifying network connectivity, an event identifying the opening or closing of a data management and data rendering module, and other triggering events that will occur to those of skill in the art.

The exemplary aggregation preferences (432) of FIG. 5A also include a data source preferences (523). Data source preferences are preferences identifying user selected sources of data for aggregation and synthesis according to embodiments of the present invention. Examples of data source preferences identifying user selected sources of data may include specific data source identified by a user, such as a URL pointing to a specific news RSS source. The exemplary aggregation preferences (432) of FIG. 5A include an identification of disparate data sources (524).

Data source preferences identifying user selected sources of data may also include a data source type identified by a user, such as the type 'news RSS source'; and other preferences as will occur to those of skill in the art. Data source preferences identifying user selected sources of data may also data type preferences identifying a particular type of data to be retrieved from an available source. Such data types identify the kind and form of data to be retrieved. Data types may include data types according to data structure, file format, protocol in which the data is transmitted, and other distinctions as will occur to those of skill in the art.

The three exemplary data source preferences of specific data sources, types of data sources and type of data are of explanation and not for limitation. In fact, those of skill in the art may identify other data source preferences and all such data source preferences are within the scope of the present invention.

In the method of FIG. 5A, aggregating (406) data of disparate data types (402, 408) from disparate data sources (402, 522) includes receiving (506), from an aggregation process (502), a request for data (508). A request for data may be implemented as a message, from the aggregation process, to a dispatcher instructing the dispatcher to initiate retrieving the requested data and returning the requested data to the aggregation process.

In the method of FIG. 5A, aggregating (440) data of disparate data types (402, 408) from disparate data sources in dependence upon the aggregation preferences (432) also includes identifying (510), in response to the request for data (508), one of a plurality of disparate data sources (402, 522) as a source for the data. In the method of FIG. 5A, identifying (510), in response to the request for data (508), one of a plurality of disparate data sources (402, 522) as a source for the data is carried out by retrieving from the data source preferences (523) an identification of a disparate data source responsive to the request for data.

The method for aggregating (440) data of disparate data types (402, 408) from disparate data sources (1008) in dependence upon aggregation preferences (432) of FIG. 5A also includes retrieving (526) data from the identified disparate data source (522) in dependence upon the retrieval preferences (520). Retrieval preferences (520) are user defined preferences governing retrieval of data from an identified data source. Such retrieval preferences may include aggregation timing preferences that dictate to an aggregation process times to aggregate data or time periods dictating how often to aggregate data. Retrieval preferences may also include other preferences such as triggering preferences dictating to an aggregation process to aggregate data upon a triggering event such as an event identifying network connectivity, an event identifying the opening or closing of a data management and data rendering module, and other triggering events that will occur to those of skill in the art. Retrieving (526) data from the identified disparate data source (524) in dependence upon the retrieval preferences (520) therefore may be carried out by retrieving data from the identified disparate data source periodically according to retrieval preferences (520) governing how often to retrieve data, retrieving data from the identified disparate data source for a length of time governed by retrieval preferences (520), retrieving data from the identified disparate data source upon receiving a triggering event in the retrieval preferences, and so on as will occur to those of skill in the art.

In the method of FIG. 5A, aggregating (440) data of disparate data types (402, 408) from disparate data sources in dependence upon the aggregation preferences (432) also includes returning (516), to the aggregation process (502), the requested data (514). Returning (516), to the aggregation process (502), the requested data (514) may be carried out by returning the requested data to the aggregation process in a message, storing the data locally and returning a pointer pointing to the location of the stored data to the aggregation process, or any other way of returning the requested data that will occur to those of skill in the art.

Figure 6:
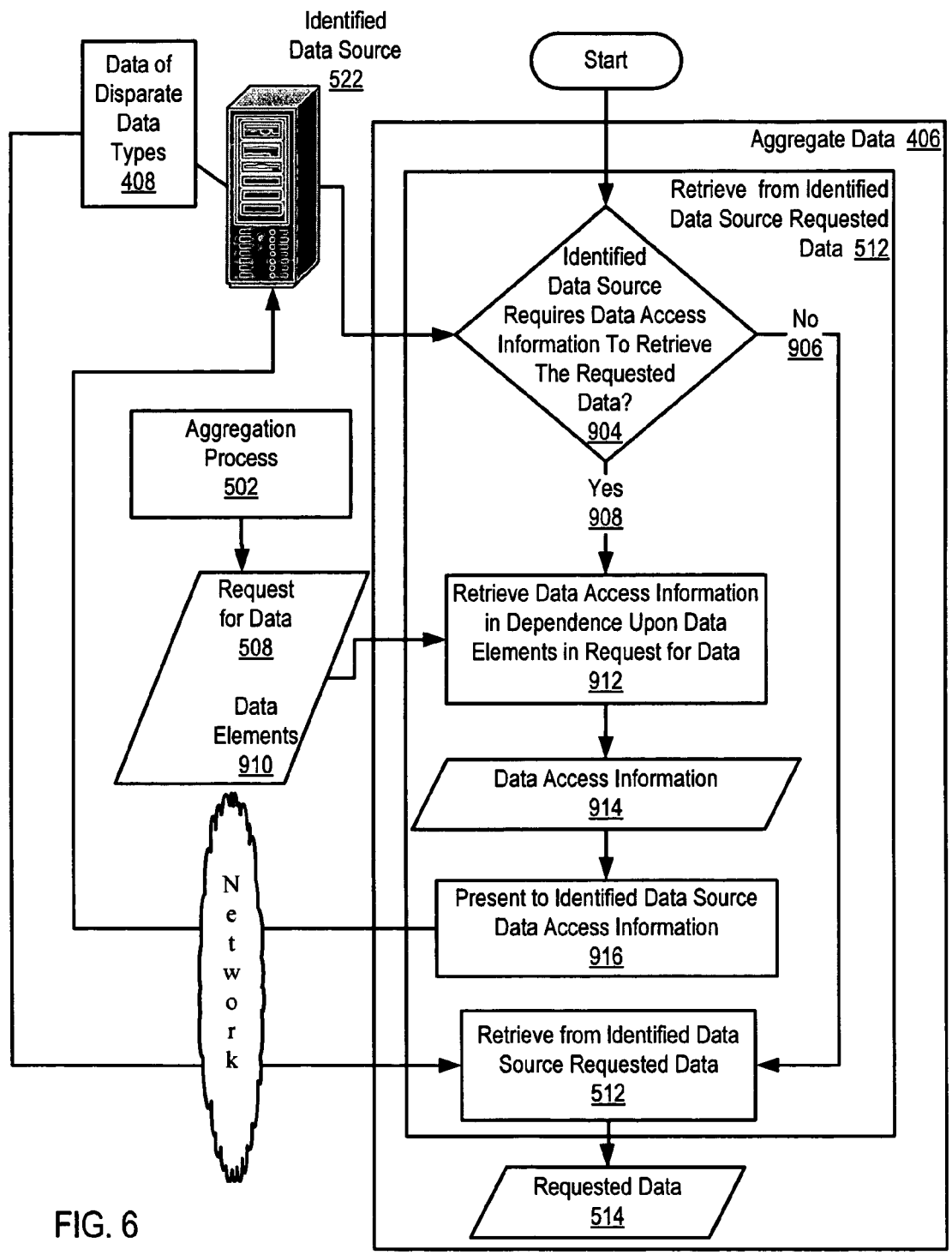
FIG. 6 sets forth a flow chart illustrating an exemplary method for retrieving, from the identified data source, the requested data according to the present invention.

As discussed above with reference to FIG. 5, aggregating data includes retrieving, from the identified data source, the requested data. For further explanation, therefore, FIG. 6 sets forth a flow chart illustrating an exemplary method for retrieving (512), from the identified data source (522), the requested data (514) according to embodiments of the present invention. In the method of FIG. 6, retrieving (512), from the identified data source (522), the requested data (514) includes determining (904) whether the identified data source (522) requires data access information (914) to retrieve the requested data (514). As discussed above in reference to FIG. 5, data access information is information which is required to access some types of data from some of the disparate sources of data. Exemplary data access information includes account names, account numbers, passwords, or any other data access information that will occur to those of skill in the art.

Determining (904) whether the identified data source (522) requires data access information (914) to retrieve the requested data (514) may be carried out by attempting to retrieve data from the identified data source and receiving from the data source a prompt for data access information required to retrieve the data. Alternatively, instead of receiving a prompt from the data source each time data is retrieved from the data source, determining (904) whether the identified data source (522) requires data access information (914) to retrieve the requested data (514) may be carried out once by, for example a user, and provided to a dispatcher such that the required data access information may be provided to a data source with any request for data without prompt. Such data access information may be stored in, for example, a data source table identifying any corresponding data access information needed to access data from the identified data source.

In the method of FIG. 6, retrieving (512), from the identified data source (522), the requested data (514) also includes retrieving (912), in dependence upon data elements (910) contained in the request for data (508), the data access information (914), if the identified data source requires data access information to retrieve the requested data (908). Data elements (910) contained in the request for data (508) are typically values of attributes of the request for data (508). Such values may include values identifying the type of data to be accessed, values identifying the location of the disparate data source for the requested data, or any other values of attributes of the request for data.

Such data elements (910) contained in the request for data (508) are useful in retrieving data access information required to retrieve data from the disparate data source. Data access information needed to access data sources for a user may be usefully stored in a record associated with the user indexed by the data elements found in all requests for data from the data source. Retrieving (912), in dependence upon data elements (910) contained in the request for data (508), the data access information (914) according to FIG. 6 may therefore be carried out by retrieving, from a database in dependence upon one or more data elements in the request, a record containing the data access information and extracting from the record the data access information. Such data access information may be provided to the data source to retrieve the data.

Retrieving (912), in dependence upon data elements (910) contained in the request for data (508), the data access information (914), if the identified data source requires data access information (914) to retrieve the requested data (908), may be carried out by identifying data elements (910) contained in the request for data (508), parsing the data elements to identify data access information (914) needed to retrieve the requested data (908), identifying in a data access table the correct data access information, and retrieving the data access information (914).

The exemplary method of FIG. 6 for retrieving (512), from the identified data source (522), the requested data (514) also includes presenting (916) the data access information (914) to the identified data source (522). Presenting (916) the data access information (914) to the identified data source (522) according to the method of FIG. 6 may be carried out by providing in the request the data access information as parameters to the request or providing the data access information in response to a prompt for such data access information by a data source. That is, presenting (916) the data access information (914) to the identified data source (522) may be carried out by a selected data source specific plug-in of a dispatcher that provides data access information (914) for the identified data source (522) in response to a prompt for such data access information. Alternatively, presenting (916) the data access information (914) to the identified data source (522) may be carried out by a selected data source specific plug-in of a dispatcher that passes as parameters to request the data access information (914) for the identified data source (522) without prompt.

Figure 7:
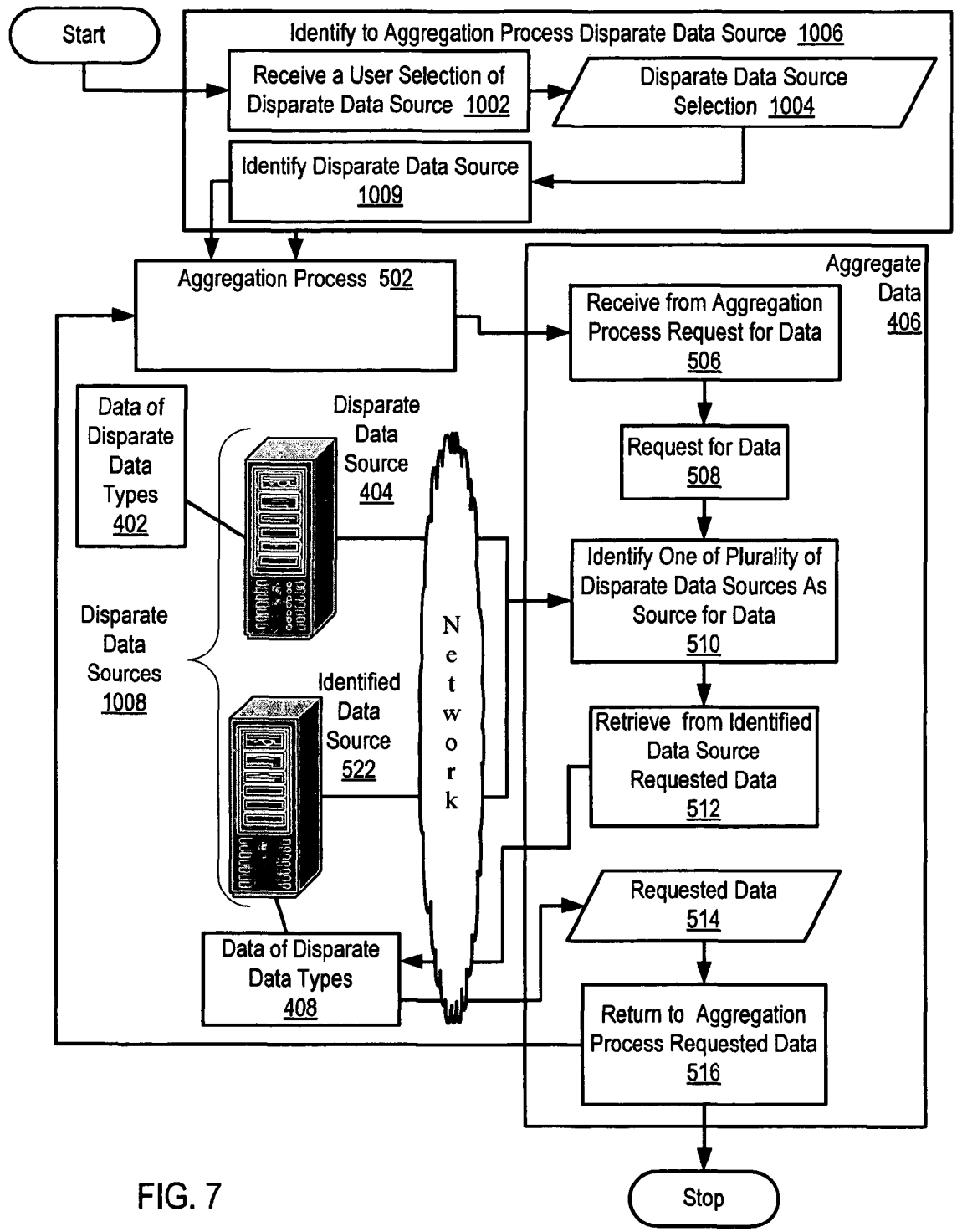
FIG. 7 sets forth a flow chart illustrating an exemplary method for aggregating data of disparate data types from disparate data sources according to the present invention.

As discussed above with reference to FIG. 5A, aggregating data of disparate data types from disparate data sources according to embodiments of the present invention typically includes identifying, to the aggregation process, disparate data sources. That is, prior to requesting data from a particular data source, that data source typically is identified to an aggregation process. In the method of FIG. 5A, for example, the data source is identified to the aggregation process by a user instruction identifying data source preferences such as the specific identification of a disparate data source. Identification of the disparate data source may also be carried out in other ways. For further explanation, therefore, FIG. 7 sets forth a flow chart illustrating an exemplary method for aggregating data of disparate data types (404, 522) from disparate data sources (404, 522) according to the present invention that includes identifying (1006), to the aggregation process (502), disparate data sources (1008). In the method of FIG. 7, identifying (1006), to the aggregation process (502), disparate data sources (1008) includes receiving (1002), from a user, a selection (1004) of the disparate data source. A user is typically a person using a data management a data rendering system to manage and render data of disparate data types (402, 408) from disparate data sources (1008) according to the present invention. Receiving (1002), from a user, a selection (1004) of the disparate data source may be carried out by receiving, through a user interface of a data management and data rendering application, from the user a user instruction containing a selection of the disparate data source and identifying (1009), to the aggregation process (502), the disparate data source (404, 522) in dependence upon the selection (1004). A user instruction is an event received in response to an act by a user such as an event created as a result of a user entering a combination of keystrokes, using a keyboard or keypad, receiving speech from a user, receiving an clicking on icons on a visual display by using a mouse, pressing an icon on a touchpad, or other use act as will occur to those of skill in the art. A user interface in a data management and data rendering application may usefully provide a vehicle for receiving user selections of particular disparate data sources.

In the example of FIG. 7, identifying disparate data sources to an aggregation process is carried out by a user. Identifying disparate data sources may also be carried out by processes that require limited or no user interaction. For further explanation, FIG. 8 sets forth a flow chart illustrating an exemplary method for aggregating data of disparate data types from disparate data sources requiring little or no user action that includes identifying (1006), to the aggregation process (502), disparate data sources (1008) includes identifying (1102), from a request for data (508), data type information (1106). Disparate data types identify data of different kind and form. That is, disparate data types are data of different kinds. The distinctions in data that define the disparate data types may include a difference in data structure, file format, protocol in which the data is transmitted, and other distinctions as will occur to those of skill in the art. Data type information (1106) is information representing these distinctions in data that define the disparate data types.

Figure 8:
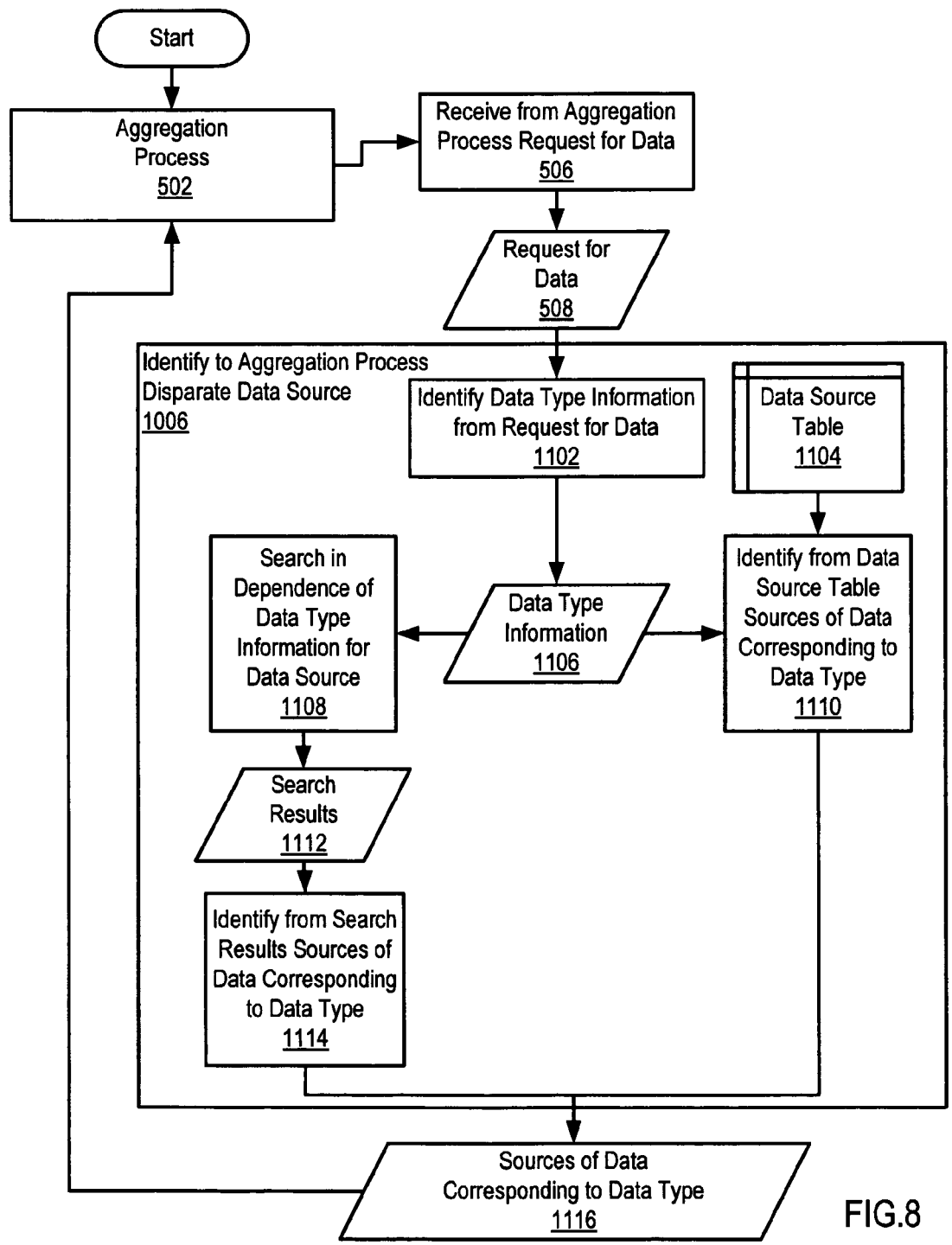
FIG. 8 sets forth a flow chart illustrating an exemplary method for aggregating data of disparate data types from disparate data sources according to the present invention.

Identifying (1102), from the request for data (508), data type information (1106) according to the method of FIG. 8 may be carried out by extracting a data type code from the request for data. Alternatively, identifying (1102), from the request for data (508), data type information (1106) may be carried out by inferring the data type of the data being requested from the request itself, such as by extracting data elements from the request and inferring from those data elements the data type of the requested data, or in other ways as will occur to those of skill in the art.

In the method for aggregating of FIG. 8, identifying (1006), to the aggregation process (502), disparate data sources also includes identifying (1110), from a data source table (1104), sources of data corresponding to the data type (1116). A data source table is a table containing identification of disparate data sources indexed by the data type of the data retrieved from those disparate data sources. Identifying (1110), from a data source table (1104), sources of data corresponding to the data type (1116) may be carried out by performing a lookup on the data source table in dependence upon the identified data type. Data source tables (1104) such as the data source table of FIG. 8 may also be populated using data source preferences discussed above with reference to FIG. 5A.

In some cases no such data source may be found for the data type or no such data source table is available for identifying a disparate data source. In the method of FIG. 8 therefore includes an alternative method for identifying (1006), to the aggregation process (502), disparate data sources that includes searching (1108), in dependence upon the data type information (1106), for a data source and identifying (1114), from search results (112) returned in the data source search, sources of data corresponding to the data type (1116). Searching (1108), in dependence upon the data type information (1106), for a data source may be carried out by creating a search engine query in dependence upon the data type information and querying the search engine with the created query. Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. In this context, it is useful to remember that URLs do more than merely request file transfers. URLs identify resources on servers. Such resources may be files having filenames, but the resources identified by URLs also include, for example, queries to databases. Results of such queries do not necessarily reside in files, but they are nevertheless data resources identified by URLs and identified by a search engine and query data that produce such resources. An example of URL encoded data is:

http://www.example.com/
    search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

Identifying (1114), from search results (1112) returned in the data source search, sources of data corresponding to the data type (1116) may be carried out by retrieving URLs to data sources from hyperlinks in a search results page returned by the search engine.

As discussed above, data management and data rendering for disparate data types includes synthesizing aggregated data of disparate data types into data of a uniform data type. For further explanation, FIG. 9 sets forth a flow chart illustrating a method for synthesizing (414) aggregated data of disparate data types (412) into data of a uniform data type. As discussed above, aggregated data of disparate data types (412) is the accumulation, in a single location, of data of disparate types. This location of the aggregated data may be either physical, such as, for example, on a single computer containing aggregated data, or logical, such as, for example, a single interface providing access to the aggregated data. Also as discussed above, disparate data types are data of different kind and form. That is, disparate data types are data of different kinds. Data of a uniform data type is data having been created or translated into a format of predetermined type. That is, uniform data types are data of a single kind that may be rendered on a device capable of rendering data of the uniform data type. Synthesizing (414) aggregated data of disparate data types (412) into data of a uniform data type advantageously makes the content of the disparate data capable of being rendered on a single device.

Figure 9:
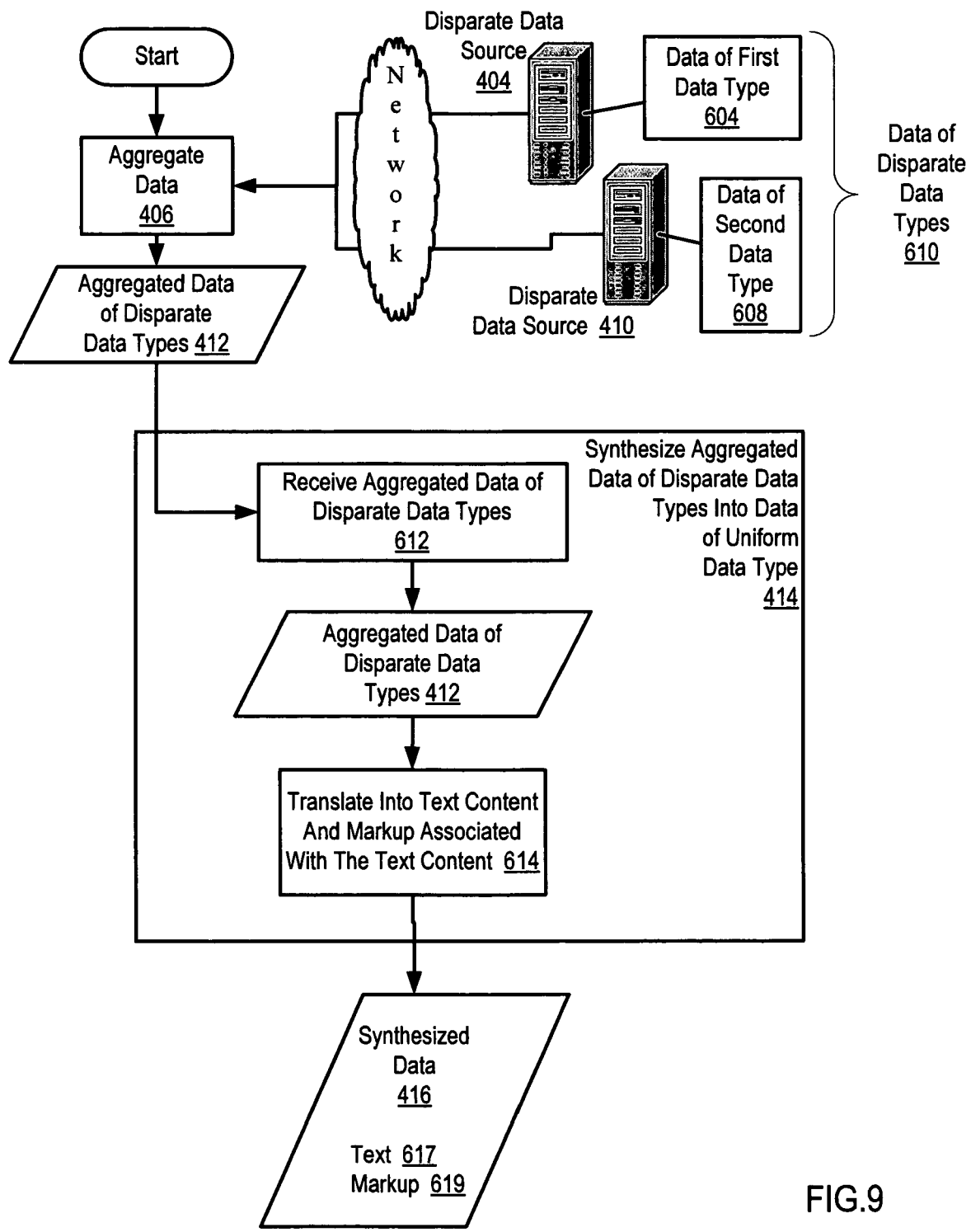
FIG. 9 sets forth a flow chart illustrating an exemplary method for synthesizing aggregated data of disparate data types into data of a uniform data type according to the present invention.

In the method of FIG. 9, synthesizing (414) aggregated data of disparate data types (412) into data of a uniform data type includes receiving (612) aggregated data of disparate data types. Receiving (612) aggregated data of disparate data types (412) may be carried out by receiving, from aggregation process having accumulated the disparate data, data of disparate data types from disparate sources for synthesizing into a uniform data type.

In the method for synthesizing of FIG. 9, synthesizing (414) the aggregated data (406) of disparate data types (610) into data of a uniform data type also includes translating (614) each of the aggregated data of disparate data types (610) into text (617) content and markup (619) associated with the text content. Translating (614) each of the aggregated data of disparate data types (610) into text (617) content and markup (619) associated with the text content according to the method of FIG. 9 includes representing in text and markup the content of the aggregated data such that a browser capable of rendering the text and markup may render from the translated data the same content contained in the aggregated data prior to being synthesized. In the method of FIG. 9, translating (614) each of the aggregated data of disparate data types (610) into text (617) content and markup (619) may be carried out by creating an X+V document for the aggregated data including text, markup, grammars and so on as will be discussed in more detail below with reference to FIG. 10. The use of X+V is for explanation and not for limitation. In fact, other markup languages may be useful in synthesizing (414) the aggregated data (406) of disparate data types (610) into data of a uniform data type according to the present invention such as XML, VXML, or any other markup language as will occur to those of skill in the art.

Translating (614) each of the aggregated data of disparate data types (610) into text (617) content and markup (619) such that a browser capable of rendering the text and markup may render from the translated data the same content contained in the aggregated data prior to being synthesized may include augmenting the content in translation in some way. That is, translating aggregated data types into text and markup may result in some modification to the content of the data or may result in deletion of some content that cannot be accurately translated. The quantity of such modification and deletion will vary according to the type of data being translated as well as other factors as will occur to those of skill in the art.

Translating (614) each of the aggregated data of disparate data types (610) into text (617) content and markup (619) associated with the text content may be carried out by translating the aggregated data into text and markup and parsing the translated content dependent upon data type. Parsing the translated content dependent upon data type means identifying the structure of the translated content and identifying aspects of the content itself, and creating markup (619) representing the identified structure and content.

Consider for further explanation the following markup language depiction of a snippet of audio clip describing the president.

```
<head> original file type= 'MP3' keyword = 'president' number = '50',
keyword = 'air force' number = '1' keyword = 'white house'
number ='2' >
</head>
   <content>
      Some content about the president
   </content>
```

In the example above an MP3 audio file is translated into text and markup. The header in the example above identifies the translated data as having been translated from an MP3 audio file. The exemplary header also includes keywords included in the content of the translated document and the frequency with which those keywords appear. The exemplary translated data also includes content identified as 'some content about the president.'

As discussed above with reference to FIG. 9, one useful uniform data type for synthesized data is XHTML plus Voice. XHTML plus Voice ('X+V') is a Web markup language for developing multimodal applications, by enabling voice with voice markup. X+V provides voice-based interaction in devices using both voice and visual elements. Voice enabling the synthesized data for data management and data rendering according to embodiments of the present invention is typically carried out by creating grammar sets for the text content of the synthesized data. A grammar is a set of words that may be spoken, patterns in which those words may be spoken, or other language elements that define the speech recognized by a speech recognition engine. Such speech recognition engines are useful in a data management and rendering engine to provide users with voice navigation of and voice interaction with synthesized data.

Figure 10:
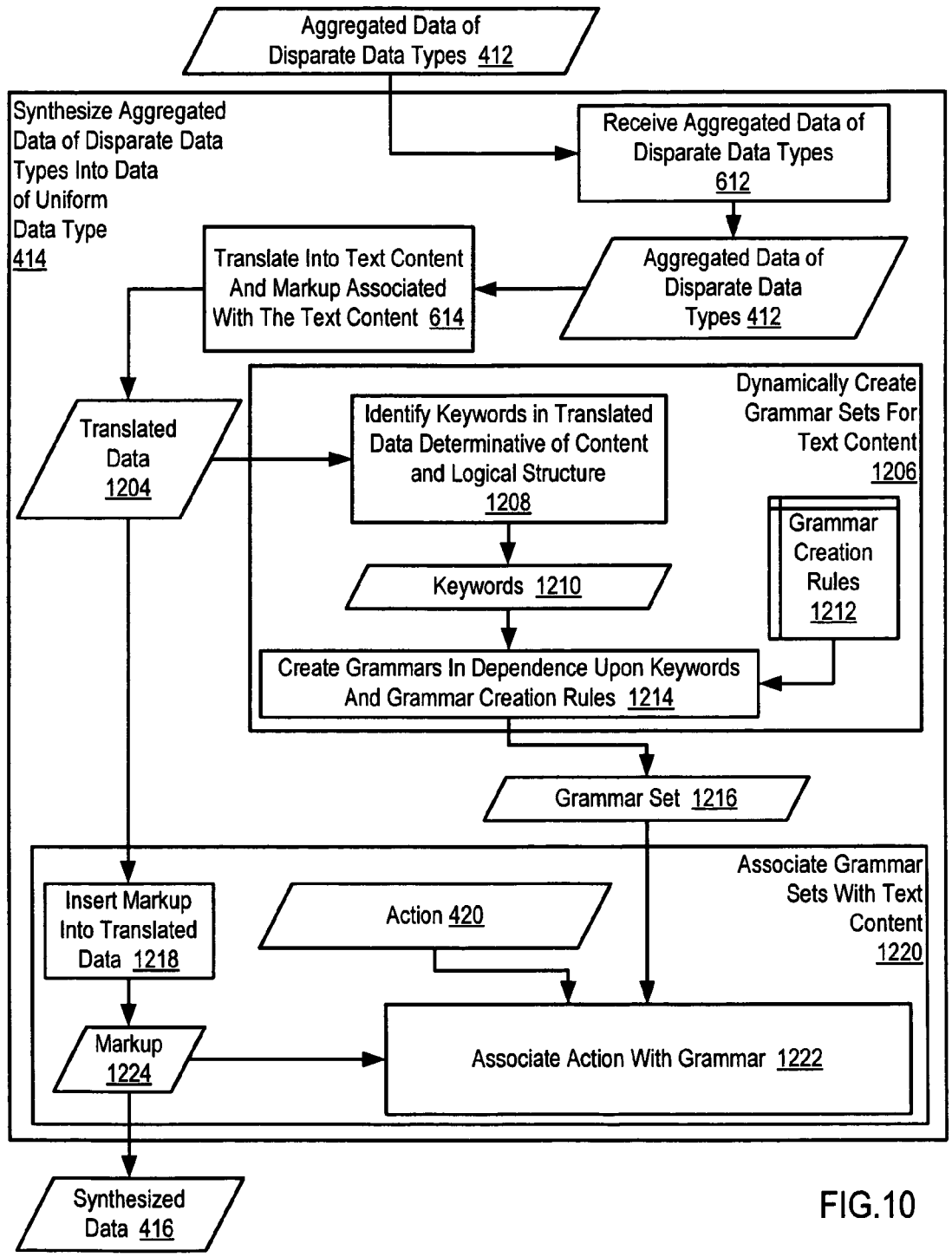
FIG. 10 sets forth a flow chart illustrating an exemplary method for synthesizing aggregated data of disparate data types into data of a uniform data type according to the present invention.

For further explanation, therefore, FIG. 10 sets forth a flow chart illustrating a method for synthesizing (414) aggregated data of disparate data types (412) into data of a uniform data type that includes dynamically creating grammar sets for the text content of synthesized data for voice interaction with a user. Synthesizing (414) aggregated data of disparate data types (412) into data of a uniform data type according to the method of FIG. 10 includes receiving (612) aggregated data of disparate data types (412). As discussed above, receiving (612) aggregated data of disparate data types (412) may be carried out by receiving, from aggregation process having accumulated the disparate data, data of disparate data types from disparate sources for synthesizing into a uniform data type.

The method of FIG. 10 for synthesizing (414) aggregated data of disparate data types (412) into data of a uniform data type also includes translating (614) each of the aggregated data of disparate data types (412) into translated data (1204) comprising text content and markup associated with the text content. As discussed above, translating (614) each of the aggregated data of disparate data types (412) into text content and markup associated with the text content includes representing in text and markup the content of the aggregated data such that a browser capable of rendering the text and markup may render from the translated data the same content contained in the aggregated data prior to being synthesized. In some cases, translating (614) the aggregated data of disparate data types (412) into text content and markup such that a browser capable of rendering the text and markup may include augmenting or deleting some of the content being translated in some way as will occur to those of skill in the art.

In the method of FIG. 10, translating (1202) each of the aggregated data of disparate data types (412) into translated data (1204) comprising text content and markup may be carried out by creating an X+V document for the synthesized data including text, markup, grammars and so on as will be discussed in more detail below. The use of X+V is for explanation and not for limitation. In fact, other markup languages may be useful in translating (614) each of the aggregated data of disparate data types (412) into translated data (1204) comprising text content and markup associated with the text content as will occur to those of skill in the art.

The method of FIG. 10 for synthesizing (414) aggregated data of disparate data types (412) into data of a uniform data type may include dynamically creating (1206) grammar sets (1216) for the text content. As discussed above, a grammar is a set of words that may be spoken, patterns in which those words may be spoken, or other language elements that define the speech recognized by a speech recognition engine In the method of FIG. 10, dynamically creating (1206) grammar sets (1216) for the text content also includes identifying (1208) keywords (1210) in the translated data (1204) determinative of content or logical structure and including the identified keywords in a grammar associated with the translated data. Keywords determinative of content are words and phrases defining the topics of the content of the data and the information presented the content of the data. Keywords determinative of logical structure are keywords that suggest the form in which information of the content of the data is presented. Examples of logical structure include typographic structure, hierarchical structure, relational structure, and other logical structures as will occur to those of skill in the art. Identifying (1208) keywords (1210) in the translated data (1204) determinative of content may be carried out by searching the translated text for words that occur in a text more often than some predefined threshold. The frequency of the word exceeding the threshold indicates that the word is related to the content of the translated text because the predetermined threshold is established as a frequency of use not expected to occur by chance alone. Alternatively, a threshold may also be established as a function rather than a static value. In such cases, the threshold value for frequency of a word in the translated text may be established dynamically by use of a statistical test which compares the word frequencies in the translated text with expected frequencies derived statistically from a much larger corpus. Such a larger corpus acts as a reference for general language use.

Identifying (1208) keywords (1210) in the translated data (1204) determinative of logical structure may be carried out by searching the translated data for predefined words determinative of structure. Examples of such words determinative of logical structure include 'introduction,' 'table of contents,' 'chapter,' 'stanza,' 'index,' and many others as will occur to those of skill in the art.

In the method of FIG. 10, dynamically creating (1206) grammar sets (1216) for the text content also includes creating (1214) grammars in dependence upon the identified keywords (1210) and grammar creation rules (1212). Grammar creation rules are a pre-defined set of instructions and grammar form for the production of grammars. Creating (1214) grammars in dependence upon the identified keywords (1210) and grammar creation rules (1212) may be carried out by use of scripting frameworks such as JavaServer Pages, Active Server Pages, PHP, Perl, XML from translated data. Such dynamically created grammars may be stored externally and referenced, in for example, X+V the <grammar src=""/> tag that is used to reference external grammars.

The method of FIG. 10 for synthesizing (414) aggregated data of disparate data types (412) into data of a uniform data type includes associating (1220) the grammar sets (1216) with the text content. Associating (1220) the grammar sets (1216) with the text content includes inserting (1218) markup (1224) defining the created grammar into the translated data (1204). Inserting (1218) markup in the translated data (1204) may be carried out by creating markup defining the dynamically created grammar inserting the created markup into the translated document.

The method of FIG. 10 also includes associating (1222) an action (420) with the grammar. As discussed above, an action is a set of computer instructions that when executed carry out a predefined task. Associating (1222) an action (420) with the grammar thereby provides voice initiation of the action such that the associated action is invoked in response to the recognition of one or more words or phrases of the grammar.

In synthesizing aggregated data of disparate data types into data of a uniform data type, as discussed above, individual users may have unique preferences for synthesizing aggregated data of disparate data types. As discussed above synthesizing the aggregated data of disparate data types into data of a uniform data type may be carried out in dependence upon synthesis preferences. For further explanation, therefore, FIG. 10A sets forth a flow chart illustrating an exemplary method for synthesizing (442) the aggregated data of disparate data types (412) into data of a uniform data type in dependence upon synthesis preferences (436). As discussed above, synthesis preferences are user provided preferences governing aspects of synthesizing data of disparate data types. Synthesis preferences include preferences for synthesizing data of a particular data type, as well as preferences for other aspects of synthesizing the data such as the volume of data to synthesize, presentation formatting for the synthesized data, prosody preferences for aural presentation of the synthesized data, grammar preferences for synthesizing the data, and other preferences that will occur to those of skill in the art.

Figure 10A:
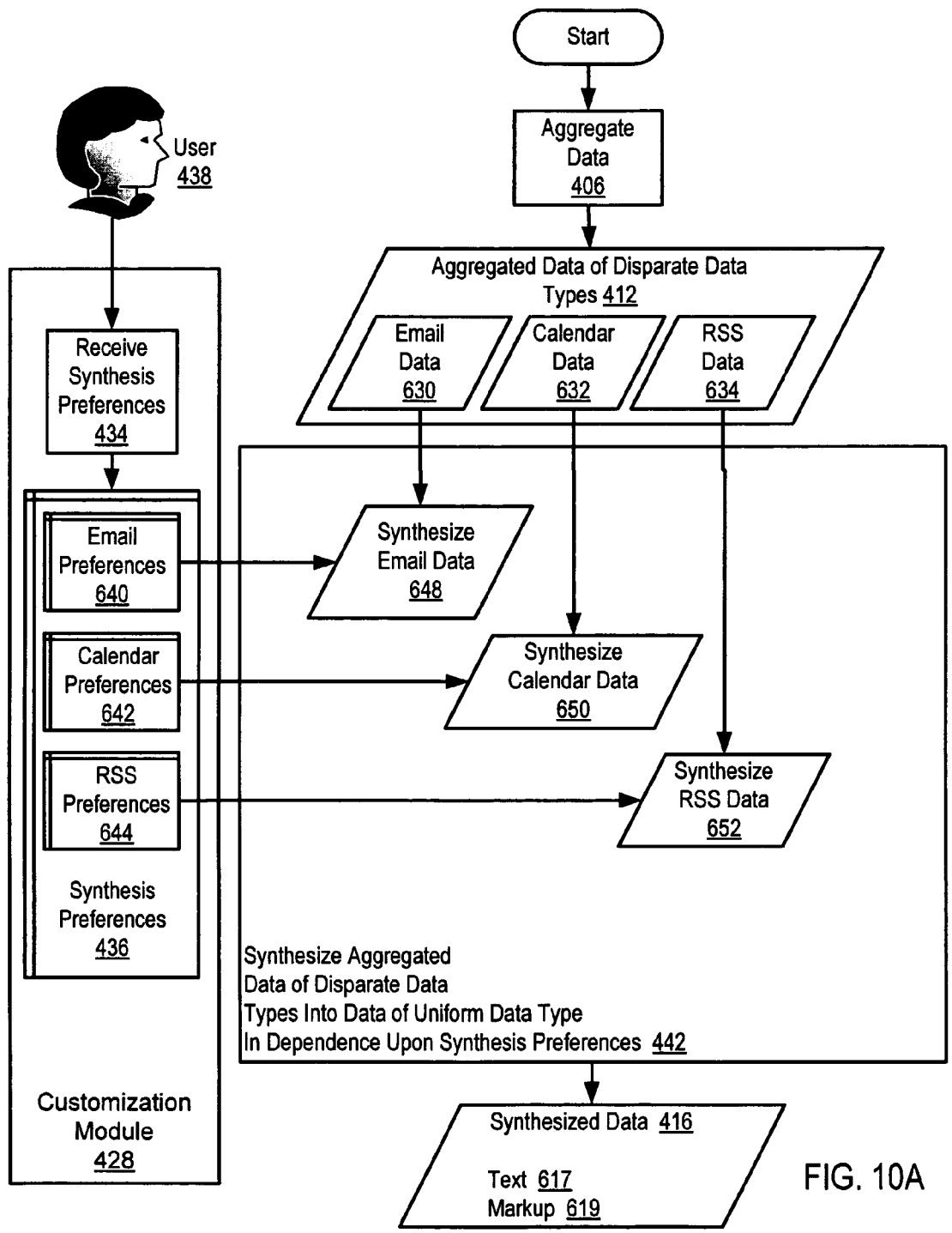
FIG. 10A sets forth a flow chart illustrating an exemplary method for synthesizing the aggregated data of disparate data types into data of a uniform data type in dependence upon synthesis preferences.

The method of FIG. 10A for synthesizing (442) the aggregated data of disparate data types (412) into data of a uniform data type in dependence upon synthesis preferences (436) is often carried out differently according to the native data type of the aggregated data of disparate data types (412) which is to be synthesized. The differences in carrying out synthesizing the aggregated data of each data type in dependence upon synthesis preferences (436) for each data type typically include different data type-specific synthesis preferences (640-644).

In the example of FIG. 10A, these different data type-specific synthesis preferences (640-644) include email preferences (640). Email preferences (640) are email-specific preferences governing the synthesis of aggregated data having email as its native data type. Email preferences (640) may include number of emails to synthesize, formatting for presentation of synthesized emails, preferences for synthesizing attachments to emails, prosody preferences for aural presentation of the email data (630), email-specific grammar preferences, or any other email preferences (640) as will occur to those of skill in the art.

Synthesizing (442) the aggregated data of disparate data types (412) into data of a uniform data type in dependence upon synthesis preferences (436) includes synthesizing (649) email data (630) in dependence upon the email preferences (640). Synthesizing (649) email data (630) in dependence upon email preferences (640) may be carried out by retrieving email preferences (640) in the synthesis preferences (436), identifying a particular synthesis process in dependence upon the email preferences, and executing the identified synthesis process.

In the example of FIG. 10A the synthesis preferences (436) also include calendar preferences (650). Calendar preferences (650) are calendar-specific preferences governing the synthesis of aggregated data having calendar data as its native data type. Calendar preferences (650) may include specific dates, or date ranges of calendar data (632) to synthesize, formatting preferences for presentation of synthesized calendar data, prosody preferences for aural presentation of the calendar data (632), calendar-data-specific grammar preferences, preferences for reminder processes in presenting the calendar data (632), or any other calendar preferences (642) as will occur to those of skill in the art.

Synthesizing (442) the aggregated data of disparate data types (412) into data of a uniform data type in dependence upon synthesis preferences (436) includes synthesizing (650) calendar data (632) in dependence upon the calendar preferences (642). Synthesizing (650) calendar data (632) in dependence upon calendar preferences (642) may be carried out by retrieving calendar preferences (642) in the synthesis preferences (436), identifying a particular synthesis process in dependence upon the calendar preferences, and executing the identified synthesis process.

In the example of FIG. 10A the synthesis preferences (436) include RSS preferences (652). RSS preferences (644) are RSS-specific preferences governing the synthesis of aggregated data having RSS data (634) as its native data type. RSS preferences (644) may include formatting preferences for presentation of synthesized RSS data (652), prosody preferences for aural presentation of the RSS data (634), RSS-data-specific grammar preferences, preferences for reminder processes in presenting the RSS data (634), or any other RSS preferences (644) as will occur to those of skill in the art.

Synthesizing (442) the aggregated data of disparate data types (412) into data of a uniform data type in dependence upon synthesis preferences (436) includes synthesizing (652) RSS data (634) in dependence upon the RSS preferences (644). Synthesizing (652) RSS data (634) in dependence upon RSS preferences (644) may be carried out by retrieving RSS preferences (644) in the synthesis preferences (436), identifying a particular synthesis process in dependence upon the RSS preferences, and executing the identified synthesis process.

As discussed above, synthesizing aggregated data of disparate data types into data of a uniform data type in dependence upon synthesis preferences is often carried out differently according to the native data type of the aggregated data to be synthesized. One common native data type of aggregated data of disparate data types (412) synthesized (442) in the method of FIG. 10A is email data (630). Such synthesized email is useful in data management and data rendering according to embodiments of the present invention. For further explanation, therefore, FIG. 10B sets forth a flow chart illustrating a method for email management and rendering that includes receiving aggregated email in native form according to the present invention. Receiving (654) aggregated email in native form (656) may be carried out by receiving from an aggregation process aggregated email in native form (656). Such an aggregation process may retrieve email in native form by calling an email plug-in in a dispatcher designed to retrieve from a predesignated email server email in native form and return the email in native form to the aggregation process as discussed above.

Figure 10B:
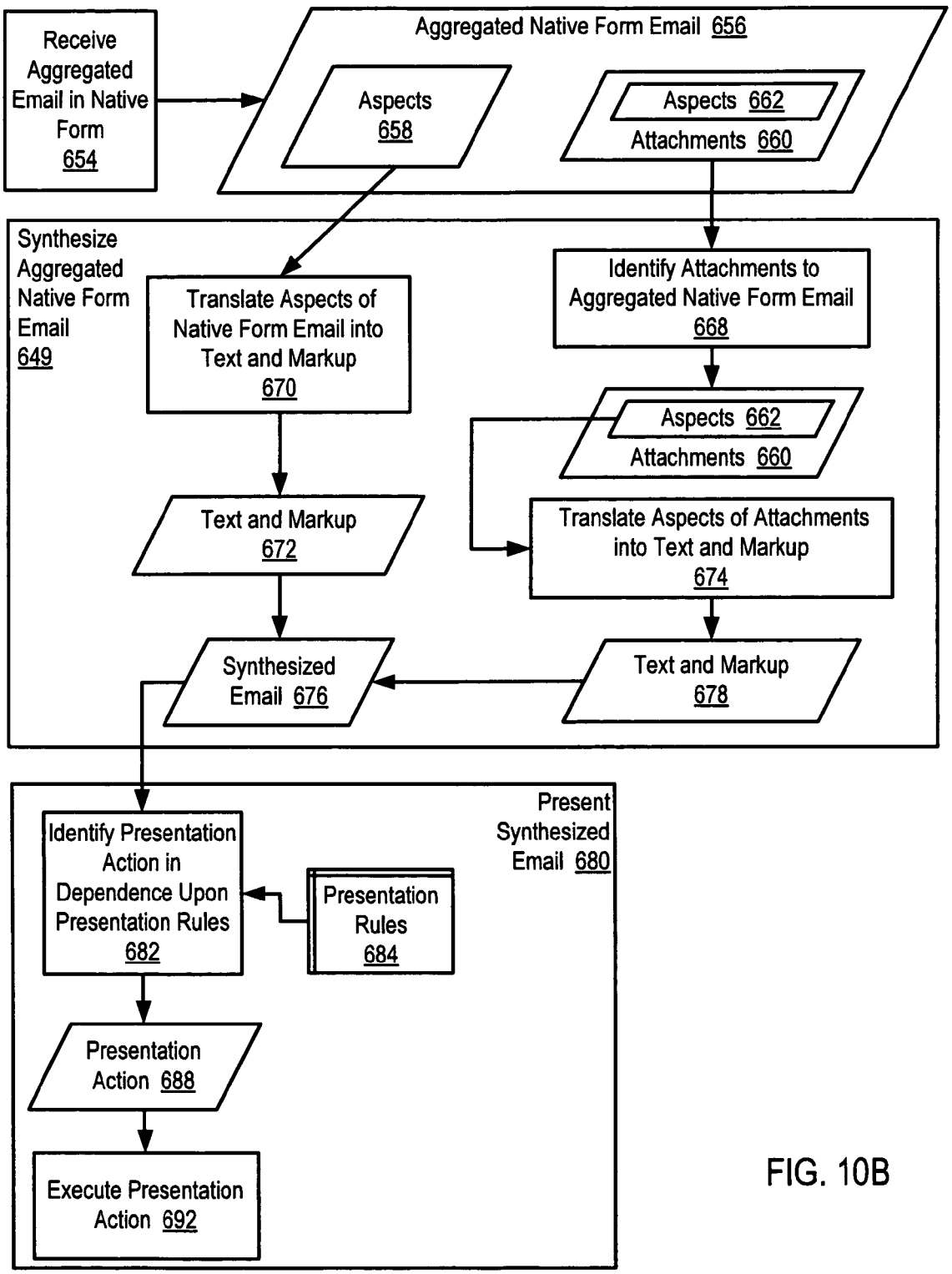
FIG. 10B sets forth a flow chart illustrating an exemplary method for email management and rendering according to the present invention.

The method of FIG. 10B also includes synthesizing (649) the aggregated native form email (656) into a synthesized email (676). Synthesizing (649) the aggregated native form email (656) into a synthesized email (676) includes translating (670) g aspects (658) of the aggregated native form email (656) into text and markup (672). The translated aspects (658) of the aggregated native form email (656) are typically various constituent parts of the aggregated native form email (656) predetermined to be included in the synthesized email. Such constituent parts of email predetermined to be included in the synthesized email include text contained in the body of the email in native form, the sender and recipient of the email, the subject of the email as listed in the subject line, time stamps associated with the sending or receipt of the email, or any other aspects of the aggregated native form email (656) as will occur to those of skill in the art.

Translating (670) aspects (658) of the aggregated native form email (656) into text and markup (672) is often carried out by identifying display text for presentation of the email and content of the email and presentation markup defining the presentation of the synthesized email. For example, translating (670) aspects (658) of the aggregated native form email (656) into text and markup (672) may be carried out by translating the body of each singular aggregated native form email (656) into text containing the content of the email body and markup related to an email body structure, translating the header of the aggregated native form email (656) into text containing header information and markup identifying the translated text as header information, and so on.

The aspects of the aggregated native form email to be translated are often dependent upon the native format of the email itself. The format of Internet e-mail is defined in RFC 2822, which is an updated version of RFC 822. These standards specify the formats of the email such as text email headers and body, as well as rules pertaining to commonly used header fields such as "To:", "Subject:", "From:", and "Date." This standard defines the format for the syntax and headers that make up email messages. A typical email message format consists of specific headers, with no more than one header on a line, followed by a blank line and the message body. An email message following the typical format ends with a period ('.') following a blank line after the message body. Synthesizing (649) the aggregated native form email (656) into a synthesized email (676) by translating (670) aspects (658) of the aggregated native form email (656) into text and markup (672) often therefore includes identifying aspects of the email message defined by the native standard formatting and translating those identified aspects into display text and markup.

Consider, for example, the following exemplary email message:
To: bob.jones@acme.com
From: frank.smith@widget.com
Subject: Email Messages
Did you get my email messages?
and the following email message after translation:

```
<type = synthesized email>
<email ID = 1234>
```

```
<to> bob.jones@acme.com </to>
<from> frank.smith@widget.com </from>
< subject> Email Messages</subject>
<body> Did you get my email messages? </body>
```

In the example above, the native rules for commonly used header fields are used to identify the email fields "To:", "From:", "Subject:", and the "Body," the conclusion of which is defined by a period. In the example above, translating the email is carried out by creating markup <to></to>, <subject></subject>, <from></from>, and <body></body> identifying in the synthesized emails the fields that were identified from the native rules of the native email. Translating the email also includes translating the contents of those identified fields into display text: "bob.jones@acme.com", "frank.smith@widget.com", "Email Messages", and "Did you get my email messages?"

Although the aggregated native form email (656) is often translated in groups of email, the individuality of each singular email in the native form email (656) is often preserved thereby preserving individual presentation of each email to the user. As mentioned above, translating aggregated data types often results in some modification to the content of the data or may result in deletion of some content that cannot be accurately translated with the quantity of data lost dependent upon implementation, settings, and other factors as will occur to those of skill in the art.

Synthesizing (649) the aggregated native form email (656) into a synthesized email (676) according to the method of FIG. 10B includes identifying (668) attachments (660) to the aggregated native form email (656) and also translating (674) aspects (662) of those attachments (660) into text and markup (678). Attachments (660) are files containing data in a form which cannot typically be transmitted as an email message which are attached to an email message and sent with the email message. Email systems often include only text data in an email message, which necessitates the use of special headers to identify non-text data and encoding schemes to represent non-text data. For example, Internet email is typically transmitted via Simple Mail Transfer Protocol ('SMTP'). Because SMTP was initially designed to support only 7-bit ASCII characters, which include only English text characters, SMTP does not transmit other types of files reliably. Multipurpose Internet Mail Extensions ('MIME') format is therefore used to transmit data other than 7-bit ASCII characters as attachments. MIME defines mechanisms for sending other kinds of information in e-mail as attachments, such as, for example, text in languages other than English, text using character encodings other than ASCII, and 8-bit binary content such as files containing images, sounds, movies, and computer programs.

As discussed above, the basic format of Internet e-mail includes commonly used header fields such as "To:," "Subject:," "From:," and "Date:." In addition to the headers defined by RFC 2822, MIME defines a collection of email headers for specifying additional attributes of a message in connection with attachments. Types of MIME email headers for specifying additional attributes of a message include content-type headers and content-transfer-encoding headers. The content-type header field specifies both the type and subtype of data in the message. For instance the media type image/gif specifies a message body that contains a GIF image. Content-transfer-encoding headers designate the transfer encoding used to map binary data, as discussed immediately below.

The content-transfer-encoding headers defines a set of transfer encodings which can be used to represent 8-bit binary data using characters from the 7-bit ASCII character set. The 8-bit binary data is encoded by mapping the binary data using characters from the 7-bit ASCII character set. The 8-bit binary data is then inserted into the email with the special email headers and sent with the email as an attachment. One common example of an attachment often sent with the email is a graphics file, such as a JPEG file.

One way of identifying (668) attachments (660) to the aggregated native form email (656) may be carried out by recognizing that 8-bit binary data has been transmitted in encoded form, identifying the transfer encodings used to encode the 8-bit binary data, and decoding the 8-bit binary data using the identified transfer encodings. Another way of identifying (668) attachments (660) to the aggregated native form email (656) may be carried out by identifying a content-type header in the email, and recognizing that the content-type header contains data consistent with an attachment. A content-type header is a header in an email which indicates the type and subtype of the content of an email message. And still another way of identifying (668) attachments (660) to the aggregated native form email (656) may be carried out by identifying an original file name and recognizing that the filename extension of the original file name is consistent with an attachment.

The method of FIG. 10B also includes translating (674) aspects (662) of attachments (660) into text and markup (678). Aspects (662) of an attachment (660) to be translated are various constituent parts of the attachment. Aspects (662) of an attachment (660) may include an identification of the format or file type of the attachment, the content or data contained in the attachment, the name of the attachment, and any other aspects of an attachment as will occur to those of skill in the art. Translating (674) aspects (662) of the attachments (660) into text and markup (678) may be carried out by identifying display text for presentation of the attachment and content of the attachment and presentation markup defining the presentation of the attachment.

The method of FIG. 10B also includes presenting (680) the synthesized email (676). Presenting (680) the synthesized email (676) may be carried out by visually displaying content of the synthesized email, speech rendering the content of the synthesized email, and other ways of presenting the synthesized email as will occur to those of skill in the art.

In the method of FIG. 10B presenting (680) the synthesized email (676) also includes identifying (682) a presentation action (688) in dependence upon presentation rules (684) and executing (692) the presentation action (688). A presentation action (688) is typically implemented as software carrying out the presentation of the synthesized email. Such presentation actions include software for visually displaying the content of the synthesized email, speech rendering the content of the synthesized email, and so on.

A presentation rule (684) is a set of conditions governing the selection of a one or more particular presentation actions (688) to present particular synthesized email. Such presentation rules often select a particular presentation action in dependence upon the content of the synthesized email, the conditions of the device upon which the synthesized email is rendered and other factors as will occur to those of skill in the art. For further explanation consider the following exemplary presentation rule:

```
IF received user command = 'Read Emails'; AND
Device = 'laptop computer'; AND
State of Device = 'cover closed';
    THEN Presentation Action = ReadEmailToBluetoothHeadset().
```

In the exemplary presentation rule above, a particular presentation action called ReadEmailToBluetoothHeadset( ) is identified when three particular conditions are met. Those particular conditions are that the user command 'Read Emails' is received by a data management and data rendering module on a laptop computer whose cover is closed. The identified presentation action readEmailToBluetoothHeadset( ) is software designed to establish a Bluetooth connection with a user's headset and invoke a speech engine that presents as speech the content of the synthesized email.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

Synthesized data is often presented through one or more channels as discussed below with reference to FIG. 12. Presenting (680) the synthesized email (676) according to the method of FIG. 10B may also include presenting the synthesized email through one or more assigned channels.

Figure 10C:
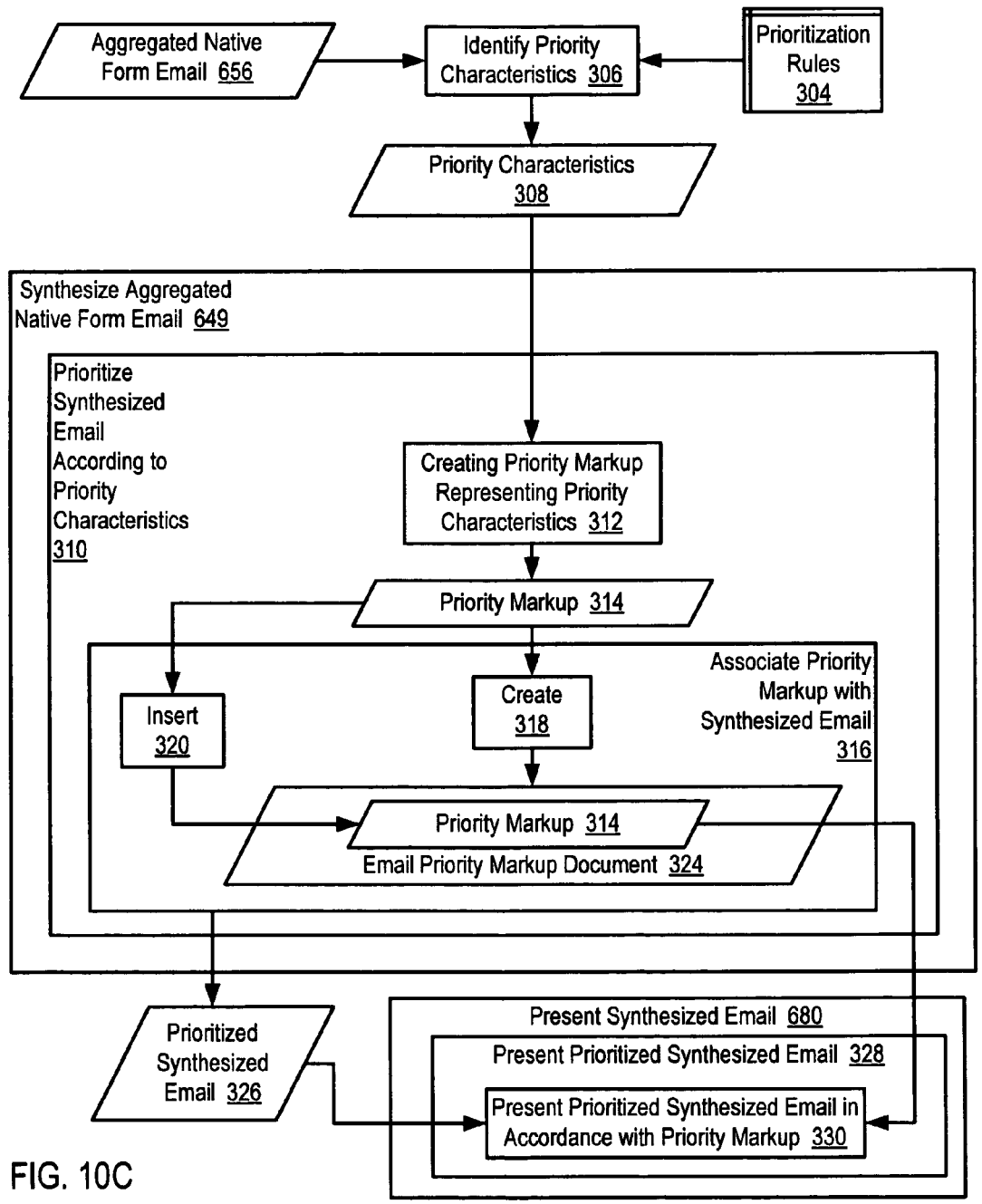
FIG. 10C sets forth a flow chart illustrating a further exemplary method for email management and rendering according to the present invention.

To reduce the time a user must devote to browsing through synthesized email in order to access desired content, email management and rendering according to the present invention may usefully provide synthesized email prioritized according to user preferences. Such prioritized synthesized email advantageously provides the user with a vehicle for browsing the highest priority emails first, and the lowest priority emails last, or not at all and so on. For further explanation, therefore, FIG. 10C sets forth a flow chart illustrating an exemplary method for email management and rendering that also includes identifying (306), according to prioritization rules (304), priority characteristics (308) in the aggregated native form email (656). In the example of FIG. 10C, synthesizing (649) the aggregated native form email (656) into a synthesized email (676, FIG. 10B) also includes prioritizing (310) the synthesized email (676, FIG. 10B) according to the priority characteristics (308) and presenting (680) the synthesized email (676, FIG. 10B) that also includes presenting (328) the prioritized synthesized email (326).

Priority characteristics (308) useful in prioritizing email according to priority rules are aspects of the aggregated native form email (656) that are predesignated as determinative of priority. Examples of priority characteristics (308) include a predetermined names or keywords found in content of the native form email; a user designation of importance in the native form email (656); a particular sender or recipient in the header of the native form email (656); and other priority characteristics as will occur to those of skill in the art. Prioritization rules (304) are predefined rules for identifying priority characteristics in the aggregated native form email. Such prioritization rules (304) often not only identify email as priority email but also include hierarchical priority assignments email. For further explanation consider the following prioritization rule:

```
IF email content contains keyword: 'meeting'; AND
email content contains keyword: 'important'; AND
if sender = 'Mr. Jones' THEN
email priority = 'high.'
```

In the exemplary prioritization rule if the email content contains both keywords, 'meeting' and 'important' and the email is from the user's boss 'Mr. Jones,' then the email is assigned a high priority. Prioritization rules advantageously provide a vehicle for both identifying emails of importance and also ranking the emails in order of their relative importance.

In the method of FIG. 10C, synthesizing (649) the aggregated native form email (656) into a synthesized email (676, FIG. 10B) includes prioritizing (310) the synthesized email (676, FIG. 10B) according to the priority characteristics (308). Prioritizing (310) the synthesized email (676, FIG. 10B) according to the priority characteristics (308) is carried out by creating (312) priority markup (314) representing the priority characteristics (308) and associating (316) the priority markup (314) with the synthesized email. One way of associating (316) the priority markup (314) with the synthesized email includes creating (318) an email priority markup document (324) and inserting (320) the priority markup (314) into the email priority markup document (324). An email priority markup document (324) is a document accessible by the data navigation and data rendering engine useful in presenting synthesized email according to assigned priorities. For further explanation consider the following snippet of an email priority markup document:

```
<head>
<document = 'email priority markup document'>
</head>
    ...
    <body>
        < email ID = 1232 priority = high; email ID =
        0004 <priority = low;
        email ID = 1111 priority = low; email ID = 1222
        priority = medium>
    </body>
```

In the exemplary email priority markup document above emails are identified by unique email ID and a priority markup is associated with each email ID. In the example above, an email identified as email ID '1232' is assigned a 'high' priority. In the same example, an email identified as email ID '0004' is assigned a 'low' priority, and email identified as email ID '1111' is assigned a 'low' priority; and an email identified as email ID '1222' is assigned a 'medium' priority. The exemplary email priority markup document is presented for explanation and not for limitation. In fact email priority markup documents according to the present invention may be implemented in many ways and all such implementations are well within the scope of the present invention.

In the method of FIG. 10C, presenting (680) the synthesized email further comprises presenting (328) the prioritized synthesized email (326). One way of presenting (328) the prioritized synthesized email (326) may be carried out by presenting (330) the prioritized synthesized email (326) according to priorities assigned in email priority markup document. In such cases, a particular email and its assigned priority may be extracted from the email priority markup document and the email is presented according to the assigned priority. Presenting (328) the prioritized synthesized email (326) may be carried out by displaying the synthesized email (326) visually in prioritized order, presenting email with icons representing assigned priority, aurally presenting the content of prioritized email in prioritized order, playing earcons identifying the priority of emails, and so on as will occur to those of skill in the art.

Email may also be prioritized in dependence upon user defined email preferences. For further explanation, FIG. 10D sets forth a flow chart illustrating an exemplary method for creating prioritization rules from user defined email preferences. As discussed above, email preferences (640) are email-specific preferences governing the synthesis of aggregated data having email as its native data type. Email preferences (640) may include number of emails to synthesize, formatting for presentation of synthesized emails, preferences for synthesizing attachments to emails, prosody preferences for aural presentation of the email data, email-specific grammar preferences, or any other email preferences as will occur to those of skill in the art. Email preferences may also include explicit priority designations useful in creating prioritization rules such as types of email to be designated as high priority, senders and recipients whose emails are to be designated as high priority and so on as will occur to those of skill in the art.

Figure 10D:
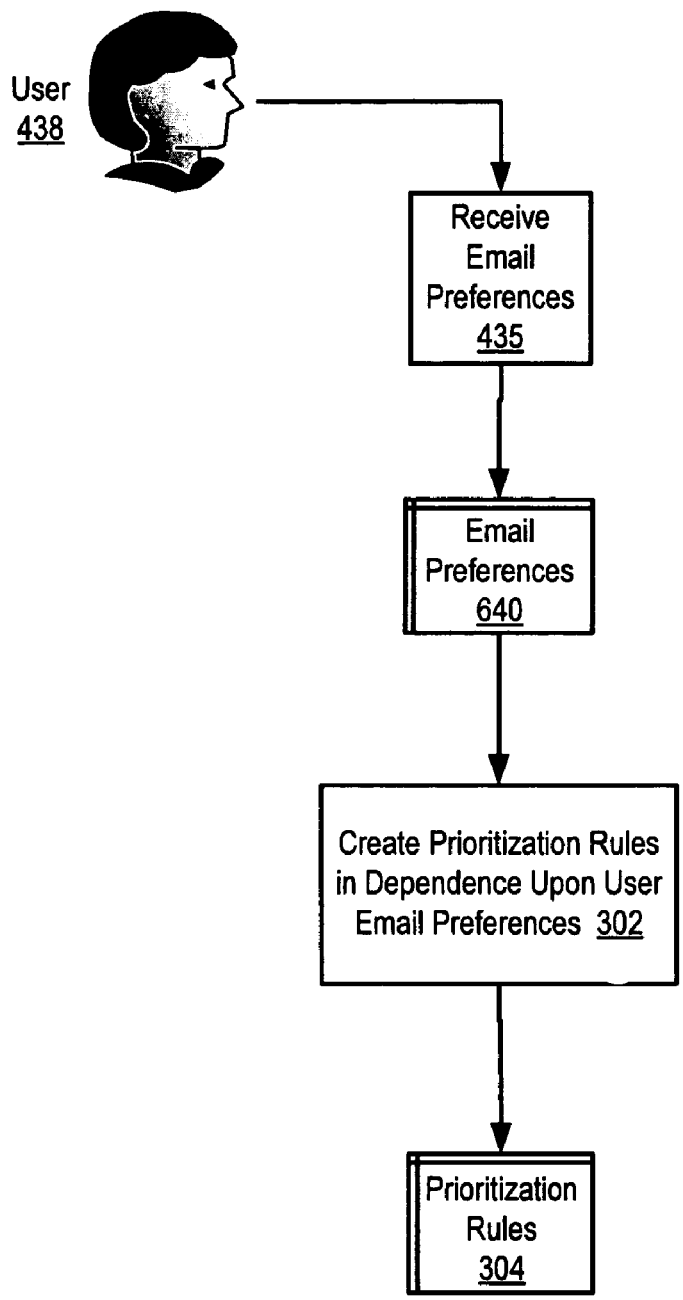
FIG. 10D sets forth a flow chart illustrating an exemplary method for creating prioritization rules from user defined email preferences.

The method of FIG. 10D includes receiving (435) email preferences from a user (438). Receiving (435) email preferences (640) from a user (438) may be carried out by receiving a user instruction to set an email preference (640). Such a user instruction may be received through a selection screen having GUI input boxes for receiving user instructions, selection menus designed to received user instructions, and so on as will occur to those of skill in the art. Receiving (435) email preferences (640) may include receiving an explicit email priority preference.

The method of FIG. 10D also includes creating (302) prioritization rules (304) in dependence upon the email preferences (640). As discussed above, the email preferences may include explicit priority preferences. Creating (302) prioritization rules (304) in dependence upon the email preferences (640) may therefore be carried out by creating a prioritization rule in dependence upon the explicit email priority preference. For further explanation consider the following example of a prioritization rule created in dependence upon an explicit user priority preference that defines all email from a priority senders list as high priority.

```
PrioritySendersList = {Bob, Jim, Tom, Ralph, Ed, George}
If sender on prioritySendersList;
    THEN email priority = 'High'.
```

In this example, a user has selected Bob, Jim, Tom, Ralph, Ed, and George as priority senders. An email prioritization rule therefore assigns as high priority any email sent from Bob, Jim, Tom, Ralph, Ed, and George, who now included in a priority senders list.

Figure 11:
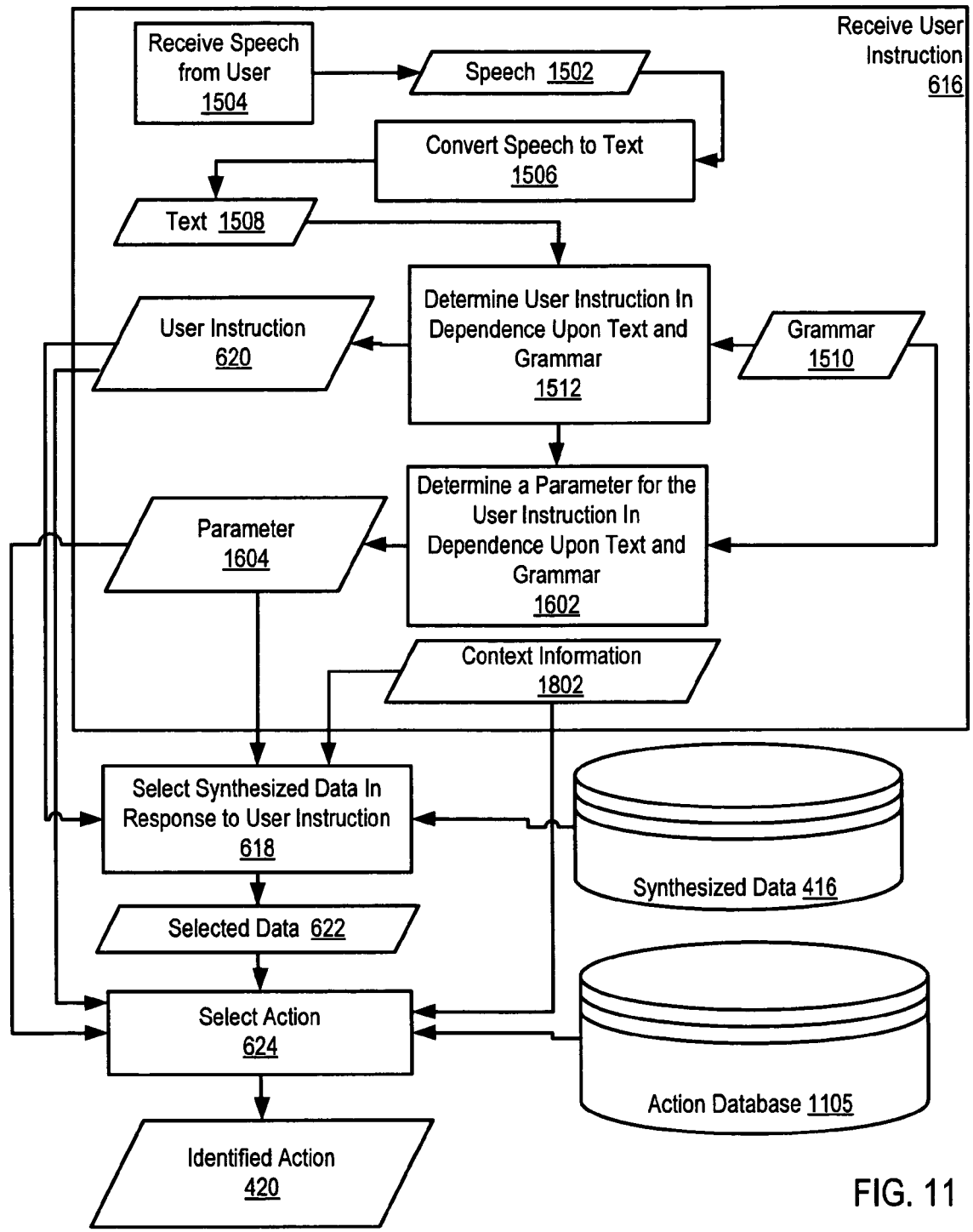
FIG. 11 sets forth a flow chart illustrating an exemplary method for identifying an action in dependence upon the synthesized data according to the present invention.

As discussed above, data management and data rendering for disparate data types includes identifying an action in dependence upon the synthesized data. For further explanation, FIG. 11 sets forth a flow chart illustrating an exemplary method for identifying an action in dependence upon the synthesized data (416) including receiving (616) a user instruction (620) and identifying an action in dependence upon the synthesized data (416) and the user instruction. In the method of FIG. 11, identifying an action may be carried out by retrieving an action ID from an action list. In the method of FIG. 11, retrieving an action ID from an action list includes retrieving from a list the identification of the action (the 'action ID') to be executed in dependence upon the user instruction and the synthesized data. The action list can be implemented, for example, as a Java list container, as a table in random access memory, as a SQL database table with storage on a hard drive or CD ROM, and in other ways as will occur to those of skill in the art. As mentioned above, the actions themselves comprise software, and so can be implemented as concrete action classes embodied, for example, in a Java package imported into a data management and data rendering module at compile time and therefore always available during run time.

In the method of FIG. 11, receiving (616) a user instruction (620) includes receiving (1504) speech (1502) from a user, converting (1506) the speech (1502) to text (1508); determining (1512) in dependence upon the text (1508) and a grammar (1510) the user instruction (620) and determining (1602) in dependence upon the text (1508) and a grammar (1510) a parameter (1604) for the user instruction (620). As discussed above with reference to FIG. 4, a user instruction is an event received in response to an act by a user. A parameter to a user instruction is additional data further defining the instruction. For example, a user instruction for 'delete email' may include the parameter 'Aug. 11, 2005' defining that the email of Aug. 11, 2005 is the synthesized data upon which the action invoked by the user instruction is to be performed. Receiving (1504) speech (1502) from a user, converting (1506) the speech (1502) to text (1508); determining (1512) in dependence upon the text (1508) and a grammar (1510) the user instruction (620); and determining (1602) in dependence upon the text (1508) and a grammar (1510) a parameter (1604) for the user instruction (620) may be carried out by a speech recognition engine incorporated into a data management and data rendering module according to the present invention.

Identifying an action in dependence upon the synthesized data (416) according to the method of FIG. 11 also includes selecting (618) synthesized data (416) in response to the user instruction (620). Selecting (618) synthesized data (416) in response to the user instruction (620) may be carried out by selecting synthesized data identified by the user instruction (620). Selecting (618) synthesized data (416) may also be carried out by selecting the synthesized data (416) in dependence upon a parameter (1604) of the user instruction (620).

Selecting (618) synthesized data (416) in response to the user instruction (620) may be carried out by selecting synthesized data context information (1802). Context information is data describing the context in which the user instruction is received such as, for example, state information of currently displayed synthesized data, time of day, day of week, system configuration, properties of the synthesized data, or other context information as will occur to those of skill in the art. Context information may be usefully used instead or in conjunction with parameters to the user instruction identified in the speech. For example, the context information identifying that synthesized data translated from an email document is currently being displayed may be used to supplement the speech user instruction 'delete email' to identify upon which synthesized data to perform the action for deleting an email.

Identifying an action in dependence upon the synthesized data (416) according to the method of FIG. 11 also includes selecting (624) an action (420) in dependence upon the user instruction (620) and the selected data (622). Selecting (624) an action (420) in dependence upon the user instruction (620) and the selected data (622) may be carried out by selecting an action identified by the user instruction. Selecting (624) an action (420) may also be carried out by selecting the action (420) in dependence upon a parameter (1604) of the user instructions (620) and by selecting the action (420) in dependence upon a context information (1802). In the example of FIG. 11, selecting (624) an action (420) is carried out by retrieving an action from an action database (1105) in dependence upon one or more a user instructions, parameters, or context information.

Executing the identified action may be carried out by use of a switch( ) statement in an action agent of a data management and data rendering module. Such a switch( ) statement can be operated in dependence upon the action ID and implemented, for example, as illustrated by the following segment of pseudocode:

```
switch (actionID) {
    Case 1: actionNumber1.take_action(); break;
    Case 2: actionNumber2.take_action(); break;
    Case 3: actionNumber3.take_action(); break;
    Case 4: actionNumber4.take_action(); break;
    Case 5: actionNumber5.take_action(); break;
    // and so on
} // end switch()
```

The exemplary switch statement selects an action to be performed on synthesized data for execution depending on the action ID. The tasks administered by the switch( ) in this example are concrete action classes named actionNumber1, actionNumber2, and so on, each having an executable member method named 'take_action( ),' which carries out the actual work implemented by each action class.

Executing an action may also be carried out in such embodiments by use of a hash table in an action agent of a data management and data rendering module. Such a hash table can store references to action object keyed by action ID, as shown in the following pseudocode example. This example begins by an action service's creating a hashtable of actions, references to objects of concrete action classes associated with a user instruction. In many embodiments it is an action service that creates such a hashtable, fills it with references to action objects pertinent to a particular user instruction, and returns a reference to the hashtable to a calling action agent.

```
Hashtable ActionHashTable = new Hashtable();
ActionHashTable.put("1", new Action1());
ActionHashTable.put("2", new Action2());
ActionHashTable.put("3", new Action3());
```

Executing a particular action then can be carried out according to the following pseudocode:

```
Action anAction = (Action) ActionHashTable.get("2");
if (anAction != null) anAction.take_action();
```

Executing an action may also be carried out by use of list. Lists often function similarly to hashtables. Executing a particular action, for example, can be carried out according to the following pseudocode:

```
List ActionList = new List();
ActionList.add(1, new Action1());
ActionList.add(2, new Action2());
ActionList.add(3, new Action3());
```

Executing a particular action then can be carried out according to the following pseudocode:

```
Action anAction = (Action) ActionList.get(2);
if (anAction != null) anAction.take_action();
```

The three examples above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

For further explanation of identifying an action in dependence upon the synthesized data consider the following example of user instruction that identifies an action, a parameter for the action, and the synthesized data upon which to perform the action. A user is currently viewing synthesized data translated from email and issues the following speech instruction: "Delete email dated Aug. 15, 2005." In the current example, identifying an action in dependence upon the synthesized data is carried out by selecting an action to delete and synthesized data in dependence upon the user instruction, by identifying a parameter for the delete email action identifying that only one email is to be deleted, and by selecting synthesized data translated from the email of Aug. 15, 2005 in response to the user instruction.

For further explanation of identifying an action in dependence upon the synthesized data consider the following example of user instruction that does not specifically identify the synthesized data upon which to perform an action. A user is currently viewing synthesized data translated from a series of emails and issues the following speech instruction: "Delete current email." In the current example, identifying an action in dependence upon the synthesized data is carried out by selecting an action to delete synthesized data in dependence upon the user instruction. Selecting synthesized data upon which to perform the action, however, in this example is carried out in dependence upon the following data selection rule that makes use of context information.

```
If synthesized data = displayed;
    Then synthesized data = 'current'.
If synthesized includes = email type code;
    Then synthesized data = email.
```

The exemplary data selection rule above identifies that if synthesized data is displayed then the displayed synthesized data is 'current' and if the synthesized data includes an email type code then the synthesized data is email. Context information is used to identify currently displayed synthesized data translated from an email and bearing an email type code. Applying the data selection rule to the exemplary user instruction "delete current email" therefore results in deleting currently displayed synthesized data having an email type code.

As discussed above, data management and data rendering for disparate data types often includes channelizing the synthesized data. Channelizing the synthesized data (416) advantageously results in the separation of synthesized data into logical channels. A channel implemented as a logical accumulation of synthesized data sharing common attributes having similar characteristics. Examples of such channels are 'entertainment channel' for synthesized data relating to entertainment, 'work channel' for synthesized data relating to work, 'family channel' for synthesized data relating to a user's family and so on.

Figure 12:
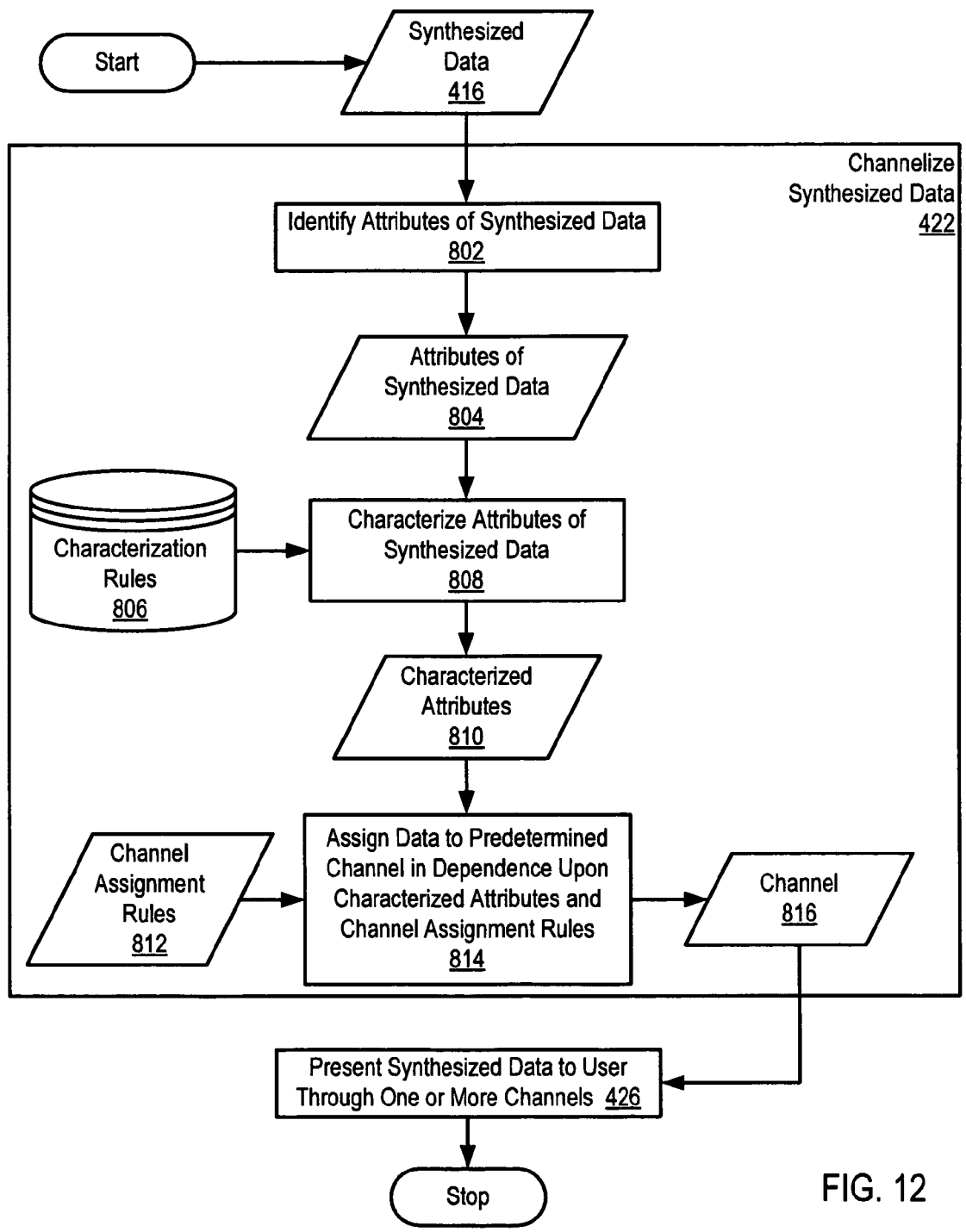
FIG. 12 sets forth a flow chart illustrating an exemplary method for channelizing the synthesized data according to the present invention

For further explanation, therefore, FIG. 12 sets forth a flow chart illustrating an exemplary method for channelizing (422) the synthesized data (416) according to embodiments of the present invention, which includes identifying (802) attributes of the synthesized data (804). Attributes of synthesized data (804) are aspects of the data which may be used to characterize the synthesized data (416). Exemplary attributes (804) include the type of the data, metadata present in the data, logical structure of the data, presence of particular keywords in the content of the data, the source of the data, the application that created the data, URL of the source, author, subject, date created, and so on. Identifying (802) attributes of the synthesized data (804) may be carried out by comparing contents of the synthesized data (804) with a list of predefined attributes. Another way that identifying (802) attributes of the synthesized data (804) may be carried out by comparing metadata associated with the synthesized data (804) with a list of predefined attributes.

The method of FIG. 12 for channelizing (422) the synthesized data (416) also includes characterizing (808) the attributes of the synthesized data (804). Characterizing (808) the attributes of the synthesized data (804) may be carried out by evaluating the identified attributes of the synthesized data. Evaluating the identified attributes of the synthesized data may include applying a characterization rule (806) to an identified attribute. For further explanation consider the following characterization rule:

```
If synthesized data = email; AND
If email to = "Joe"; AND
If email from = "Bob";
    Then email = 'work email.'
```

In the example above, the characterization rule dictates that if synthesized data is an email and if the email was sent to "Joe" and if the email sent from "Bob" then the exemplary email is characterized as a 'work email.'

Characterizing (808) the attributes of the synthesized data (804) may further be carried out by creating, for each attribute identified, a characteristic tag representing a characterization for the identified attribute. Consider for further explanation the following example of synthesized data translated from an email having inserted within it a characteristic tag.

```
<head >
original message type = 'email' to = 'joe' from = 'bob' re = 'I will be late tomorrow'</head>
    <characteristic>
        characteristic = 'work'
    <characteristic>
    <body>
        Some body content
    </body>
```

In the example above, the synthesized data is translated from an email sent to Joe from 'Bob' having a subject line including the text 'I will be late tomorrow. In the example above <characteristic> tags identify a characteristic field having the value 'work' characterizing the email as work related. Characteristic tags aid in channelizing synthesized data by identifying characteristics of the data useful in channelizing the data.

The method of FIG. 12 for channelizing (422) the synthesized data (416) also includes assigning (814) the data to a predetermined channel (816) in dependence upon the characterized attributes (810) and channel assignment rules (812). Channel assignment rules (812) are predetermined instructions for assigning synthesized data (416) into a channel in dependence upon characterized attributes (810). Consider for further explanation the following channel assignment rule:

```
If synthesized data = 'email'; and
If Characterization = 'work related email'
    Then channel = 'work channel.'
```

In the example above, if the synthesized data is translated from an email and if the email has been characterized as 'work related email' then the synthesized data is assigned to a 'work channel.'

Assigning (814) the data to a predetermined channel (816) may also be carried out in dependence upon user preferences, and other factors as will occur to those of skill in the art. User preferences are a collection of user choices as to configuration, often kept in a data structure isolated from business logic. User preferences provide additional granularity for channelizing synthesized data according to the present invention.

Under some channel assignment rules (812), synthesized data (416) may be assigned to more than one channel (816). That is, the same synthesized data may in fact be applicable to more than one channel. Assigning (814) the data to a predetermined channel (816) may therefore be carried out more than once for a single portion of synthesized data.

The method of FIG. 12 for channelizing (422) the synthesized data (416) may also include presenting (426) the synthesized data (416) to a user through one or more channels (816). One way presenting (426) the synthesized data (416) to a user through one or more channels (816) may be carried out is by presenting summaries or headings of available channels in a user interface allowing a user access to the content of those channels. These channels could be accessed via this presentation in order to access the synthesized data (416). The synthesized data is additionally to the user through the selected channels by displaying or playing the synthesized data (416) contained in the channel.

Exemplary embodiments of the present invention are described largely in the context of a fully functional computer system for email management and rendering. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for email management and rendering, the method comprising:
   receiving aggregated native form email in native form;
   creating prioritization rules identifying an importance of the aggregated native form email in dependence upon a user's email preferences, wherein prioritization rules identify priority characteristics according to the user's email preferences in the aggregated native form email, thereby providing the user with a vehicle for browsing the highest priority emails first and the lowest priority emails last among the aggregated native form email;
   identifying, according to prioritization rules, priority characteristics in the aggregated native form email, the priority characteristics including a predetermined name of a sender or recipient of the aggregated native form email or a predetermined keyword found in the content of the aggregated native form email or in the header of the aggregated native form email, the predetermined name or keyword used to determine the importance of the aggregated native form email;
   synthesizing the aggregated native form email into synthesized email including translating aspects of the aggregated native form email into text and markup; and
   presenting the synthesized email in order of importance according to the prioritization rules, further comprising:
      identifying a presentation action in dependence upon a presentation rule, wherein the presentation rule associates the presentation action with one or more conditions of a first user device upon which the synthesized email is rendered, wherein the presentation rule further identifies a second user device upon which the synthesized email is rendered if the first user device is unavailable for rendering the synthesized email; and
      executing the presentation action, wherein the presentation action carries out presentation of the synthesized email to the first user device if the first user device is available for rendering the synthesized email and to the second user device if the first user device is unavailable for rendering the synthesized email.

2. The method of claim 1 wherein the aggregated native form email comprises a first data type in a first file format compatible with a first data-specific device and a second data type in a second file format compatible with a second data-specific device; and
   wherein the first file format is not compatible with the second data-specific device, and the second file format is not compatible with the first data-specific device.

3. The method of claim 1 wherein synthesizing the aggregated native form email into a synthesized email further comprises identifying attachments to the aggregated native form email and translating aspects of the attachments into text and markup.

4. The method of claim 1 further comprising:
   identifying, according to prioritization rules, priority characteristics in the aggregated native form email; and
   wherein:
   synthesizing the aggregated native form email into a synthesized email further comprises prioritizing the synthesized email according to the priority characteristics; and
   presenting the synthesized email further comprises presenting the prioritized synthesized email.

5. The method of claim 4 further comprising:
   receiving email preferences from a user; and
   creating prioritization rules in dependence upon the email preferences.

6. The method of claim 4 wherein prioritizing the synthesized email according to the priority characteristics further comprises creating priority markup representing the priority characteristics and associating the priority markup with the synthesized email.

7. The method of claim 4 wherein associating the priority markup with the synthesized email further comprises:
   creating an email priority markup document; and
   inserting the priority markup into the email priority markup document.

8. The method of claim 4 wherein presenting the prioritized synthesized email further comprises presenting the prioritized synthesized email in accordance with the priority markup.

9. A system for email management and rendering, the system comprising:
   a computer processor;
   a computer memory operatively coupled to the computer processor, the computer memory having disposed within it computer program instructions configured to:
   receive aggregated native form email in native form;
   create prioritization rules identifying an importance of the aggregated native form email in dependence upon a user's email preferences, wherein prioritization rules identify priority characteristics according to the user's email preferences in the aggregated native form email, thereby providing the user with a vehicle for browsing the highest priority emails first and the lowest priority emails last among the aggregated native form email;
   identify, according to prioritization rules, priority characteristics in the aggregated native form email, the priority characteristics including a predetermined name of a sender or recipient of the aggregated native form email or a predetermined keyword found in the content of the aggregated native form email or in the header of the aggregated native form email, the predetermined name or keyword used to determine the importance of the aggregated native form email;
   synthesize the aggregated native form email into synthesized email including translating aspects of the aggregated native form email into text and markup; and
   present the synthesized email in order of importance according to the prioritization rules, further comprising:
      identifying a presentation action in dependence upon a presentation rule, wherein the presentation rule associates the presentation action with one or more conditions of a first user device upon which the synthesized email is rendered, wherein the presentation rule further identifies a second user device upon which the synthesized email is rendered if the first user device is unavailable for rendering the synthesized email; and executing the presentation action, wherein the presentation action carries out presentation of the synthesized email to the first user device if the first user device is available for rendering the synthesized email and to the second user device if the first user device is unavailable for rendering the synthesized email.

10. The system of claim 9 wherein the aggregated native form email comprises a first data type in a first file format compatible with a first data-specific device and a second data type in a second file format compatible with a second data-specific device; and
wherein the first file format is not compatible with the second data-specific device, and the second file format is not compatible with the first data-specific device.

11. The system of claim 9 wherein the computer memory also has disposed within it computer program instructions capable of identifying attachments to the aggregated native form email and computer program instructions capable of translating aspects of the attachments into text and markup.

12. The system of claim 9 wherein the computer memory also has disposed within it computer program instructions capable of:
identifying, according to prioritization rules, priority characteristics in the aggregated native form email;
prioritizing the synthesized email according to the priority characteristics; and
presenting the prioritized synthesized email.

13. The system of claim 12 wherein the computer memory also has disposed within it computer program instructions capable of:
receiving email preferences from a user; and
creating prioritization rules in dependence upon the email preferences.

14. The system of claim 12 wherein the computer memory also has disposed within it computer program instructions capable of creating priority markup representing the priority characteristics and associating the priority markup with the synthesized email.

15. The system of claim 12 wherein the computer memory also has disposed within it computer program instructions capable of:
creating an email priority markup document; and
inserting the priority markup into the email priority markup document.

16. The system of claim 12 wherein the computer memory also has disposed within it computer program instructions capable of presenting the prioritized synthesized email in accordance with the priority markup.

17. A computer program product for data customization for data of disparate data types, the computer program product embodied on a non-transitory computer-readable medium, the computer program product comprising:
computer program instructions configured to receive aggregated native form email in native form;
computer program instructions configured to create prioritization rules identifying an importance of the aggregated native form email in dependence upon a user's email preferences, wherein prioritization rules identify priority characteristics according to the user's email preferences in the aggregated native form email, thereby providing the user with a vehicle for browsing the highest priority emails first and the lowest priority emails last among the aggregated native form email;
computer program instructions configured to identify, according to prioritization rules, priority characteristics in the aggregated native form email, the priority characteristics including a predetermined name of a sender or recipient of the aggregated native form email or a predetermined keyword found in the content of the aggregated native form email or in the header of the aggregated native form email, the predetermined name or keyword used to determine the importance of the aggregated native form email;
computer program instructions configured to synthesize the aggregated native form email into synthesized email including translating aspects of the aggregated native form email into text and markup; and
computer program instructions configured to present the synthesized email in order of importance according to the prioritization rules, further comprising:
computer program instructions configured to identify a presentation action in dependence upon presentation rule, wherein the presentation rule associates the presentation action with one or more conditions of a first user device upon which the synthesized email is rendered, wherein the presentation rule further identifies a second user device upon which the synthesized email is rendered if the first user device is unavailable for rendering the synthesized email; and
computer program instructions configured to execute the presentation action, wherein the presentation action includes computer program instructions to carry out presentation of the synthesized email to the first user device if the first user device is available for rendering the synthesized email to the second user device if the first user device is unavailable for rendering the synthesized email.

18. The computer program product of claim 17 wherein the aggregated native form email comprises a first data type in a first file format compatible with a first data-specific device and a second data type in a second file format compatible with a second data-specific device; and
wherein the first file format is not compatible with the second data-specific device, and the second file format is not compatible with the first data-specific device.

19. The computer program product of claim 17 wherein computer program instructions for synthesizing the aggregated native form email into a synthesized email further comprise computer program instructions for identifying attachments to the aggregated native form email and translating aspects of the attachments into text and markup.

20. The computer program product of claim 17 further comprising:
computer program instructions for identifying according to prioritization rules, priority characteristics in the aggregated native form email; and wherein:
computer program instructions for synthesizing the aggregated native form email into a synthesized email further comprises prioritizing the synthesized email according to the priority characteristics; and
computer program instructions for presenting the synthesized email further comprises presenting the prioritized synthesized email.

21. The computer program product of claim 20 further comprising:
computer program instructions for receiving email preferences from a user; and
computer program instructions for creating prioritization rule in dependence upon the email preferences.

22. The computer program product of claim 20 wherein computer program instructions for prioritizing the synthesized email according to the priority markup representing the priority characteristics and computer program instructions for associating the priority markup with the synthesized email.

23. The computer program product of claim 20 wherein computer program instructions for associating the priority markup with the synthesized email further comprise:

computer program instructions for creating an email priority markup document; and computer program instructions for inserting the priority markup into the email priority markup document.

24. The computer program product of claim 20 wherein computer program instructions for presenting the prioritized synthesized email further comprise computer program instructions for presenting the prioritized synthesized email in accordance with the priority markup.

\* \* \* \* \*